(12) United States Patent
Yamada et al.

(10) Patent No.: US 10,725,565 B2
(45) Date of Patent: Jul. 28, 2020

(54) ELECTRONIC PEN AND MAIN BODY FOR ELECTRONIC PEN

(71) Applicant: Wacom Co., Ltd., Saitama (JP)

(72) Inventors: Masahiko Yamada, Saitama (JP); Kenichi Ninomiya, Kanagawa (JP)

(73) Assignee: Wacom Co., Ltd., Saitama (JP)

(*) Notice: Subject to any disclaimer, the term of this patent is extended or adjusted under 35 U.S.C. 154(b) by 67 days.

(21) Appl. No.: 15/905,234

(22) Filed: Feb. 26, 2018

(65) Prior Publication Data

US 2018/0181223 A1    Jun. 28, 2018

Related U.S. Application Data

(63) Continuation of application No. PCT/JP2016/072370, filed on Jul. 29, 2016.

(30) Foreign Application Priority Data

Sep. 10, 2015 (JP) .................................. 2015-178425

(51) Int. Cl.
*G06F 3/02* (2006.01)
*G06F 3/0354* (2013.01)
*B43K 29/08* (2006.01)
*G06F 3/038* (2013.01)
*G06K 9/24* (2006.01)

(52) U.S. Cl.
CPC .......... *G06F 3/03545* (2013.01); *B43K 29/08* (2013.01); *G06F 3/0383* (2013.01); *G06K 9/24* (2013.01)

(58) Field of Classification Search
CPC ............ G06F 3/033; G06F 3/02; G06F 3/041; G09G 5/08; G09G 5/00
See application file for complete search history.

(56) References Cited

U.S. PATENT DOCUMENTS

| | | | |
|---|---|---|---|
| 5,004,871 A | 4/1991 | Purcell | |
| 5,895,895 A * | 4/1999 | Ono ..................... | G06F 3/03545 178/19.01 |
| 8,816,993 B2 * | 8/2014 | Yuan .................... | G06F 3/03545 178/19.01 |
| 8,913,041 B2 | 12/2014 | Fukushima et al. | |
| 9,778,123 B2 | 10/2017 | Horie et al. | |
| 2005/0110777 A1 * | 5/2005 | Geaghan ............. | G06F 3/03542 345/179 |
| 2006/0222437 A1 * | 10/2006 | Yamauchi ............. | B43K 24/12 401/31 |

(Continued)

FOREIGN PATENT DOCUMENTS

JP    3-172912 A    7/1991
JP    7-44304 A    2/1995

(Continued)

*Primary Examiner* — Pegeman Karimi
(74) *Attorney, Agent, or Firm* — Seed IP Law Group LLP

(57) ABSTRACT

An electronic pen includes a first casing that includes a side switch operating element that is operable by a user; an electronic pen main body that performs an electronic pen function, the electronic pen main body being housed within the first casing; and a second casing that encloses the electronic pen main body, the second casing including a contact or an operation receiving portion of a switch that is exposed on the second casing and that is operable by the side switch operating element of the first casing.

17 Claims, 11 Drawing Sheets

(56) References Cited

U.S. PATENT DOCUMENTS

| | | | |
|---|---|---|---|
| 2007/0085836 A1* | 4/2007 | Ely | .................... G06F 3/03545 |
| | | | 345/173 |
| 2013/0162605 A1 | 6/2013 | Osakabe et al. | |
| 2014/0085270 A1 | 3/2014 | Obata | |
| 2017/0357340 A1 | 12/2017 | Kamiyama et al. | |

FOREIGN PATENT DOCUMENTS

| | | |
|---|---|---|
| JP | 7-295722 A | 11/1995 |
| JP | 2011-186803 A | 9/2011 |
| JP | 2012-190427 A | 10/2012 |
| JP | 2013-152705 A | 8/2013 |
| JP | 2013-161307 A | 8/2013 |
| JP | 2014-67265 A | 4/2014 |

* cited by examiner

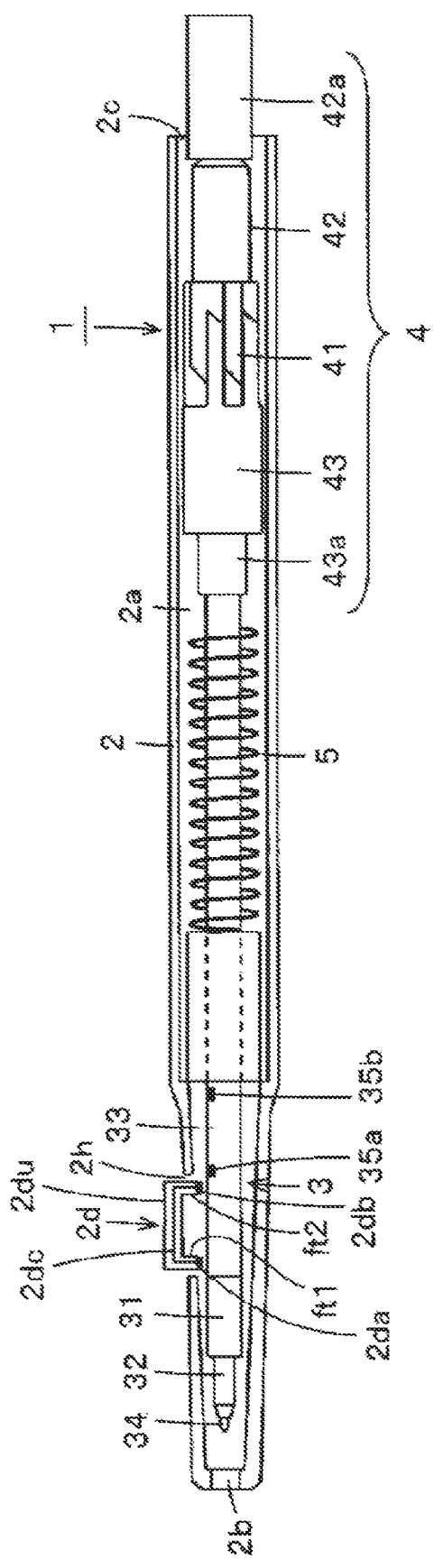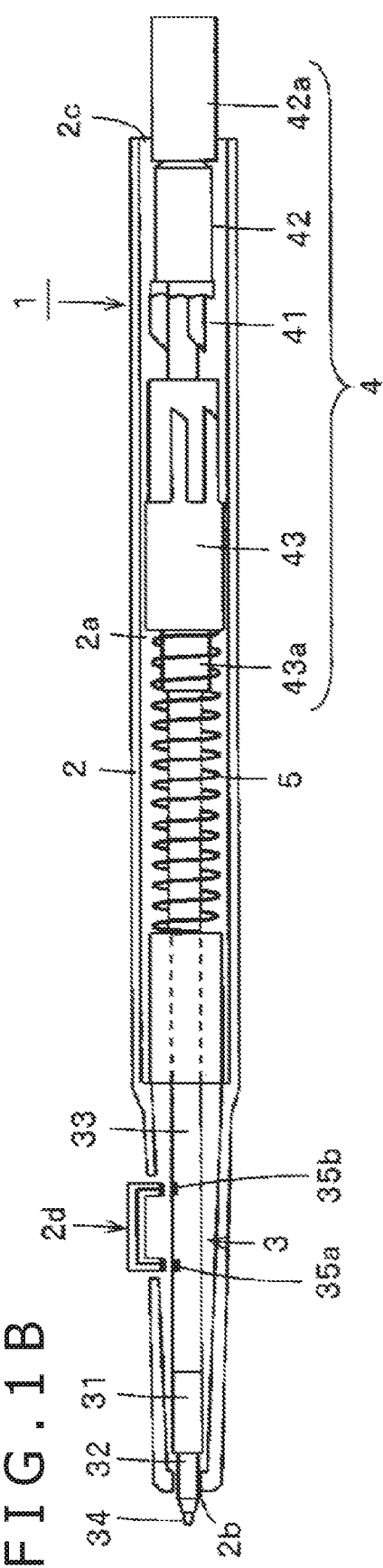

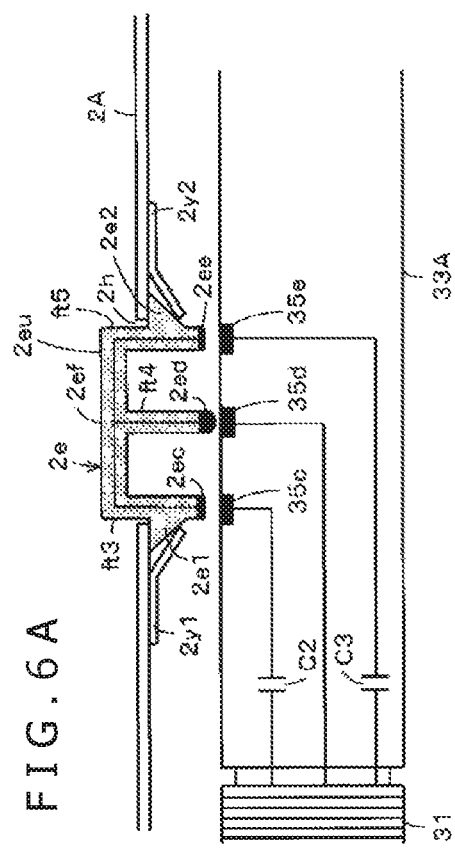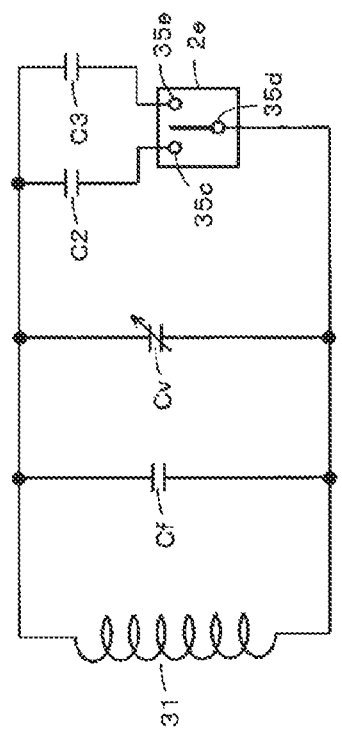

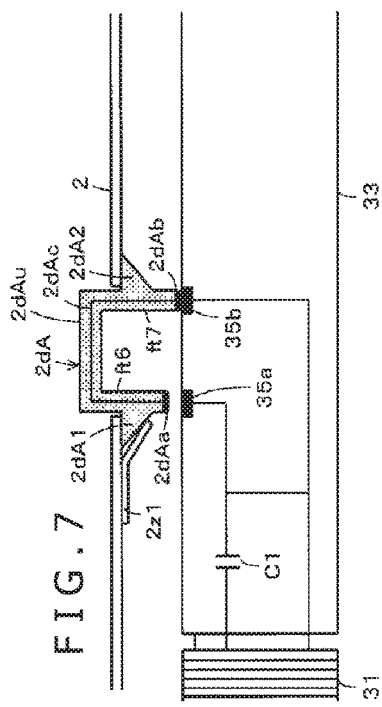
FIG. 7
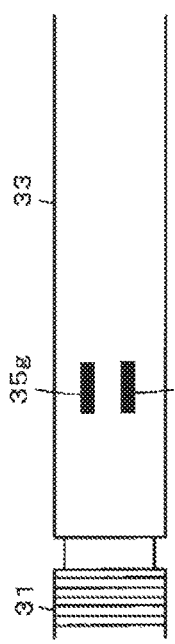
FIG. 8A
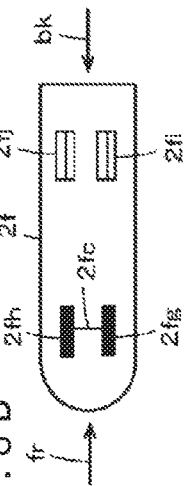
FIG. 8B
FIG. 8C
FIG. 8D

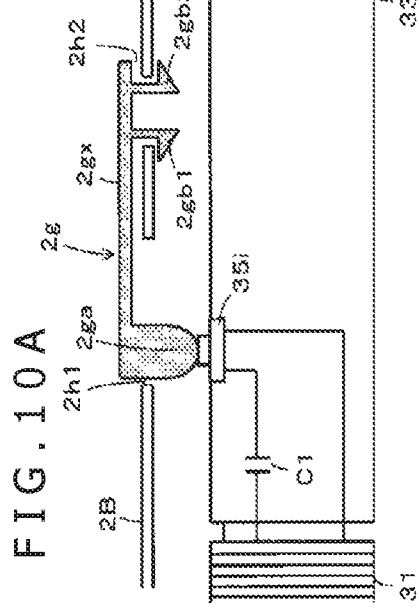
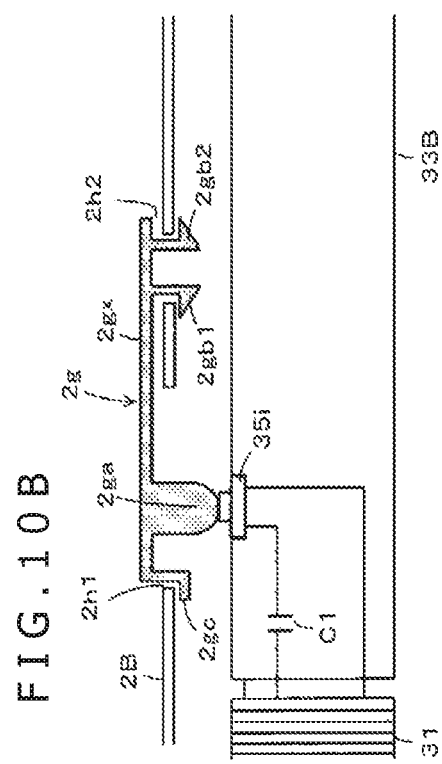
FIG. 10A
FIG. 10B

ELECTRONIC PEN AND MAIN BODY FOR ELECTRONIC PEN

BACKGROUND

Technical Field

The present disclosure relates, for example, to an electronic pen that inputs information to a position detecting device of an electromagnetic induction type or a capacitive coupling type by indicating coordinates.

Description of the Related Art

A position input device (coordinate input device) that includes a coordinate detecting sensor (position detecting sensor) of an electromagnetic induction type or a capacitance type and receives input of a coordinate position indicated by an electronic pen is used as an input device of an information processing device such as a personal computer or the like. Incidentally, an example of the coordinate detecting sensor of the electromagnetic induction type is disclosed in Japanese Patent Laid-Open No. 1995-044304 or the like, and an example of the coordinate detecting sensor of the capacitance type is disclosed in Japanese Patent Laid-Open Nos. 1995-295722 and 2015-044397 or the like.

The coordinate detecting sensor has recently been included also in an advanced mobile telephone terminal referred to as a smart phone or the like and a portable information terminal referred to as a tablet PC (Personal Computer) or the like. An electronic pen is used also to input information to these devices by indicating a coordinate position. As electronic pens are thus widely and commonly used, there is a desire to be able to use an electronic pen as easily as a commercially available ballpoint pen or the like.

Specifically, when an electronic pen can be made in the same shape and the same size as a refill for a commercially available ballpoint pen, it is possible to set the electronic pen in the casing of the commercially available ballpoint pen and use the electronic pen easily in much the same manner as the ballpoint pen. However, the shape and size of the ballpoint pen refill are limited. A part of the ballpoint pen refill excluding a pen tip thereof is often formed in a cylindrical shape, and generally has a diameter of approximately two to three millimeters. Hence, a circuit part of the electronic pen needs to be housed in a cylindrical casing having a diameter of approximately two to three millimeters.

The electronic pen includes: a core body for indicating a coordinate position intended by an operator; a pen pressure detecting portion that detects a pen pressure applied to a pen tip formed at one end portion of the core body; and a circuit section for transmitting a signal for indicating a coordinate position or notifying a pen pressure to a coordinate detecting sensor. The applicant of the present application has already filed a patent application for a technology that implements an electronic pen having such a configuration and having the same shape and the same size as a ballpoint pen refill.

As described above, the electronic pen has functions of indicating a coordinate position to the coordinate detecting sensor according to an operation of the user and notifying a pen pressure applied to the pen tip by the user to the coordinate sensor. In addition, some conventional electronic pens are provided with a side switch for implementing similar functions to left clicking and right clicking of a so-called mouse. In the case of the conventional electronic pens, parts such as a dedicated circuit board and the like can be included in a dedicated casing, and therefore the inclusion of the side switch functions can be realized relatively easily.

However, when consideration is given to forming an electronic pen in the same shape and the same size as a ballpoint pen refill as described above, it is difficult to include the side switch functions. That is, a circuit section and the like for implementing functions of the electronic pen are housed within a casing of an electronic pen main body formed in the same shape and the same size as a ballpoint pen refill. As also described above, the electronic pen main body has a diameter of two to three millimeters. Therefore a side switch similar to the conventional side switch cannot be provided to such a very thin electronic pen main body.

In addition, the electronic pen main body having the configuration of a ballpoint pen refill is used in a state of being housed within the casing of a ballpoint pen. Therefore, even when a side switch can be provided to the electronic pen main body, a user cannot directly operate the side switch. There is thus a desire to be able to easily provide a side switch that functions properly even in the case of using the electronic pen main body having the configuration of a ballpoint pen refill.

BRIEF SUMMARY

In view of the above, it is an object of the present disclosure to be able to easily provide a highly reliable side switch that functions properly even in the case of using an electronic pen main body having the configuration of a ballpoint pen refill.

In order to solve the above problems, according to a first embodiment of the disclosure, there is provided an electronic pen including a first casing that includes a side switch operating element that is operable by a user; an electronic pen main body which, in operation, performs an electronic pen function, the electronic pen main body being housed within the first casing; and a second casing that encloses of the electronic pen main body, the second casing including a contact or an operation receiving portion of a switch that is exposed on the second casing and that is operable by the side switch operating element of the first casing.

The electronic pen according to the first embodiment of the disclosure includes the first casing and the electronic pen main body having the electronic pen function. In this case, the first casing corresponds to the casing (body) of a ballpoint pen and is a part directly held by the user, and the electronic pen main body corresponds to a ballpoint pen refill and is a part that performs the electronic pen function. The electronic pen as a whole is formed by housing the electronic pen main body within the first casing.

The first casing has the side switch operating element operable by the user. The second casing that encloses the electronic pen main body has the contact or the operation receiving portion of the switch exposed so as to be operable by the side switch operating element of the first casing. When the contact is arranged so as to be exposed on the second casing, a side switch can be formed that enables an operation as to whether or not to establish electric connection between these contacts via the operating element. In addition, when the operation receiving portion of the switch is disposed so as to be exposed on the second casing, a side switch can be formed that enables an on/off operation of the switch to be performed by operating the operation receiving portion of the switch via the operating element.

According to the present disclosure, even in the case of using the electronic pen main body having the configuration of a ballpoint pen refill, a highly reliable side switch that functions properly can be provided easily.

BRIEF DESCRIPTION OF THE DRAWINGS

FIGS. 1A and 1B are diagrams depicting an example of a configuration of a first embodiment of an electronic pen according to the present disclosure;

FIGS. 6A and 6B are diagrams of assistance in explaining a configuration (FIG. 6A) of an operating element part of the second embodiment of the electronic pen according to the present disclosure and an equivalent circuit (FIG. 6B) of the second embodiment of the electronic pen;

FIG. 7 is a diagram of assistance in explaining another example of the electronic pen according to the first embodiment;

FIGS. 8A, 8B, 8C, and 8D are diagrams of assistance in explaining another example of the electronic pen according to the first embodiment;

FIGS. 10A and 10B are diagrams of assistance in explaining a detailed constitution of an operating element part of a side switch of the electronic pen according to the third embodiment;

DETAILED DESCRIPTION OF THE PREFERRED EMBODIMENTS

Figure 2A:
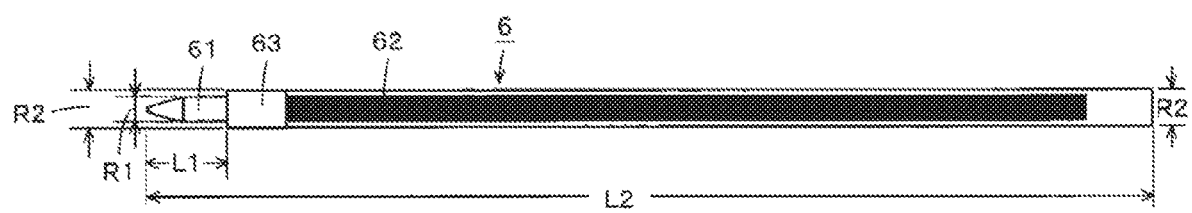
FIGS. 2A and 2B are diagrams of assistance in explaining an example of a configuration of a first embodiment of an electronic pen main body according to the present disclosure.

Embodiments of an electronic pen and an electronic pen main body portion according to the present disclosure will hereinafter be described with reference to the drawings.

First Embodiment

Description will be made supposing that an electronic pen according to a first embodiment to be described in the following is used with a position detecting device of an electromagnetic induction transmitting and receiving type.

FIGS. 1A and 1B are diagrams depicting an example of a configuration of the first embodiment of the electronic pen according to the present disclosure. The electronic pen 1 according to the first embodiment has a knock type configuration in which an electronic pen main body portion 3 is housed within a hollow portion 2a of a tubular casing (first casing) 2 and a knock cam mechanism portion 4 moves the pen tip side of the electronic pen main body portion 3 in and out from an opening 2b side at one end in a longitudinal direction of the casing 2. The electronic pen main body portion 3 in the present embodiment has a cartridge type configuration, and is thus detachable from the casing 2.

FIG. 1A depicts a state in which the whole of the electronic pen main body portion 3 is housed within the hollow portion 2a of the casing 2. FIG. 1B depicts a state in which the pen tip side of the electronic pen main body portion 3 is projected from the opening 2b of the casing 2 by the knock cam mechanism portion 4. Incidentally, in the example of FIGS. 1A and 1B, the inside of the casing 2 is made visible by sectioning the casing 2 of the electronic pen 1 into halves in a longitudinal direction and removing one of the halves. The electronic pen 1 according to the present embodiment has a configuration compatible with a commercially available knock type ballpoint pen.

The casing 2 and the knock cam mechanism portion 4 disposed in the casing 2 have an identical configuration to those of a well-known commercially available knock type ballpoint pen, and are also configured to be identical in dimensional relation to those of the commercially available knock type ballpoint pen. In other words, the casing and the knock cam mechanism portion of the commercially available knock type ballpoint pen can be used as they are as the casing 2 and the knock cam mechanism portion 4.

As depicted in FIG. 1, the knock cam mechanism portion 4 has a well-known configuration in which a cam main body 41, a knock bar 42, and a rotator 43 are combined with one another. The cam main body 41 is formed on the inner wall surface of the tubular casing 2. The knock bar 42 has an end portion 42a projecting from an opening 2c on an opposite side from the pen tip side of the casing 2 to be able to receive a knock operation by a user. The rotator 43 has a fitting portion 43a into which an end portion of the electronic pen main body portion 3 on an opposite side from the pen tip side of the electronic pen main body portion 3 is fitted.

When the end portion 42a of the knock bar 42 is depressed in the state of FIG. 1A, the knock cam mechanism portion 4 locks the electronic pen main body portion 3 into the state of FIG. 1B within the casing 2, and the pen tip side of the electronic pen main body portion 3 projects from the opening 2b of the casing 2. When the end portion 42a of the knock bar 42 is then depressed again in the state of FIG. 1B, the knock cam mechanism portion 4 releases the locked state, and a return spring 5 returns the position of the electronic pen main body portion 3 within the casing 2 to the state of FIG. 1A. A detailed configuration of the knock cam mechanism portion 4 and operation thereof are well known, and therefore description thereof will be omitted here.

In the case of the electronic pen 1 according to the first embodiment, as depicted in FIG. 1A, the electronic pen 1 according to the first embodiment is provided with a hole portion 2h in a side surface portion of the casing 2, the side surface portion being near to the opening 2b. A side switch operating element 2d is provided in the hole portion 2h. The operating element 2d has a configuration formed by connecting two short leg portions ft1 and ft2 to each other by one long pressing portion 2du. Contact portions 2da and 2db formed by conductors are provided to end portions of the two leg portions ft1 and ft2. These contact portions 2da and 2db are connected to each other by a conductor 2dc. Incidentally, though not depicted in FIG. 1, the operating element 2d is prevented from falling off easily from the casing 2, and is always biased from the inside toward the outside of the casing 2. When the user performs a depressing operation, the operating element 2d can be pushed to the inside of the casing 2.

On the other hand, terminals 35a and 35b are provided so as to be exposed on a side surface of a tubular body portion 33 (second casing) of the electronic pen main body portion 3. Then, suppose that as depicted in FIG. 1A, the whole of the electronic pen main body portion 3 is housed within the hollow portion 2a of the casing 2. In this case, even when the operating element 2d is pushed into the casing 2, the contact portions 2da and 2db provided to the operating element 2d do not come into contact with the terminals 35a and 35b of the tubular body portion 33.

On the other hand, suppose that as depicted in FIG. 1B, the knock cam mechanism portion 4 has set the pen tip side of the electronic pen main body portion 3 in a state of projecting from the opening 2b of the casing 2. In this case, when the operating element 2d is pushed into the casing 2, the contact portions 2da and 2db provided to the operating element 2d come into contact with the terminals 35a and 35b of the tubular body portion 33, and therefore electric connection is established between the terminal 35a and the terminal 35b. Thus, in the case of the electronic pen 1 according to the first embodiment, the operating element 2d provided to the casing (first casing) 2 and the terminals 35a and 35b provided so as to be exposed on the tubular body portion (second casing) 33 of the electronic pen main body portion 3 constitute a side switch.

[Embodiment of Electronic Pen Main Body Portion 3]

Figure 2B:
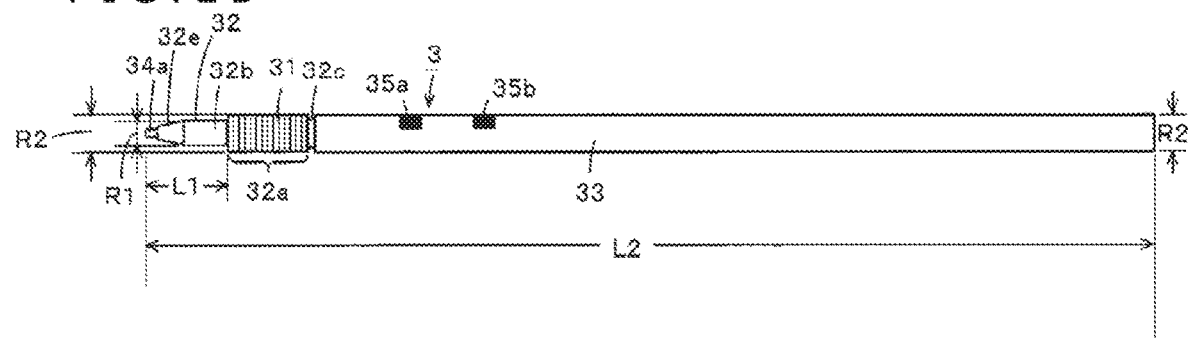

FIGS. 2A and 2B are diagrams illustrating an example of a configuration of the electronic pen main body portion 3 in comparison with a refill for a commercially available knock type ballpoint pen. Specifically, FIG. 2A depicts a refill 6 for a commercially available knock type ballpoint pen, and FIG. 2B depicts an example of a configuration of the electronic pen main body portion 3 according to the present embodiment.

As depicted in FIG. 2A, the refill 6 for a commercially available knock type ballpoint pen has a well-known configuration in which a pen tip portion 61 having a ball disposed in a tip thereof and an ink housing portion 62 are coupled and integrated with each other by a coupling portion 63. The coupling portion 63 has a same diameter as the ink housing portion 62.

On the other hand, in the electronic pen main body portion 3 according to the present embodiment, as depicted in FIG. 2B, a magnetic core, or a ferrite core 32 in the present example, wound with a coil 31 is coupled to the tubular body portion 33. Then, a core body 34 is inserted through a through hole (not depicted in FIG. 2B) of the ferrite core 32, and is fitted to a pen pressure detecting portion (not depicted in FIG. 2B) disposed within the tubular body portion 33, as will be described later. The core body 34 is thus provided as a part of the electronic pen main body portion 3. As depicted in FIG. 2B, one end portion 34a (hereinafter referred to as a tip end portion 34a) of the core body 34 projects as a pen tip from the ferrite core 32.

The ferrite core 32 in the present example is obtained by forming a through hole 32d in an axial direction in a ferrite material of a cylindrical shape, for example, the through hole 32d having a predetermined diameter r (for example, r=1 mm) for inserting the core body 34. A tapered portion 32e that gradually tapers off is formed on the pen tip side of the ferrite core 32. The tapered portion 32e makes a magnetic flux passing through the ferrite core 32 have a high density at the tapered portion 32e. Thus, magnetic coupling to a sensor of the position detecting device can be made stronger than in a case without the tapered portion 32e.

In the present embodiment, the coil 31 is partially wound rather than being wound over the entire length in the axial direction of the ferrite core 32. That is, in the present example, the coil 31 has a winding length that is approximately ½ of the entire length of the ferrite core 32, and a winding portion 32a in the ferrite core 32 for the coil is located in a position offset to the side of a coupling portion of the ferrite core 32 which coupling portion is coupled to the tubular body portion 33.

When the ferrite core 32 is viewed in the axial direction thereof, a part from an end portion of the ferrite core 32 on the pen tip side to one end of the coil winding portion is a first coil non-winding portion 32b not wound with the coil, and a small part from another end of the winding portion 32a to the side of the coupling portion of the ferrite core 32 which coupling portion is coupled to the tubular body portion 33 is a second coil non-winding portion 32c not wound with the coil 31. A length in an axial direction of the second coil non-winding portion 32c is a short length for coupling to the tubular body portion 33. On the other hand, a length in an axial direction of the first coil non-winding portion 32b in the present example is a relatively long length obtained by subtracting the length of the second coil non-winding portion from approximately ½ of the entire length of the ferrite core 32.

In the present embodiment, though not depicted, a pen pressure detecting portion is provided in the vicinity of a coupling portion of the tubular body portion 33 which coupling portion is coupled to the ferrite core 32. The pen pressure detecting portion in the present example has the configuration of a variable capacitance capacitor whose capacitance changes according to a pen pressure, the configuration using pen pressure detecting means of a well-known configuration described in Patent Document: Japanese Patent Laid-Open No. 2011-186803, for example. Incidentally, the pen pressure detecting portion can also have a configuration using a semiconductor element whose capacitance is variable according to a pen pressure, as disclosed in Japanese Patent Laid-Open No. 2013-161307, for example.

A printed board is further housed within the tubular body portion 33. A capacitor connected in parallel with the coil 31 to constitute a resonance circuit is disposed on the printed board. The variable capacitance capacitor formed by the pen pressure detecting portion is connected in parallel with the capacitor formed on the printed board, and thus forms a part of the resonance circuit (see FIG. 3B to be described later).

The whole or a part of the second coil non-winding portion of the ferrite core 32 is fitted into a recessed portion provided in the tubular body portion 33. The ferrite core 32 is thereby coupled to the tubular body portion 33. Though not depicted, when the ferrite core 32 is coupled to the tubular body portion 33, one end 31a and another end 31b of the coil 31 are electrically connected such that the coil 31 is connected in parallel with the capacitor disposed on the printed board of the tubular body portion 33.

The core body 34 having the tip end portion 34a is formed by a non-conductive rod-shaped member having a diameter smaller than the diameter r of the through hole of the ferrite core 32. The core body 34 in the present example is formed of a relatively hard resin material having elasticity, for example, POM (Polyoxymethylene). In the state in which the ferrite core 32 and the tubular body portion 33 are coupled to each other, as depicted in FIG. 2B, the core body 34 is inserted into the through hole of the ferrite core 32 from the side where the tapered portion 32e is formed.

An end portion of the core body 34 on an opposite side from the tip end portion 34a of the core body 34 is fitted into a fitting portion of the pen pressure detecting portion within the tubular body portion 33. In this case, though not depicted in detail, an elastic material such, for example, as an elastic rubber or the like is disposed in the fitting portion of the pen pressure detecting portion. The elastic material retains the end portion of the core body 34, so that the core body 34 is prevented from falling off easily. However, when the user applies a force to extract the core body 34, the core body 34 and the fitting portion of the pen pressure detecting portion in the state of being fitted to each other are separated from each other easily, so that the core body 34 can be extracted. That is, the core body 34 is replaceable.

Further, as also depicted in FIGS. 1A and 1B, the terminals 35a and 35b corresponding to the contact portions 2da and 2db of the operating element 2d described above are arranged on the tubular body portion 33 of the electronic pen main body portion 3. As will also be described later, the terminals 35a and 35b enable switching as to whether or not to connect a frequency changing capacitor further provided in parallel with a circuit section (resonance circuit) formed by connecting the coil 31, the capacitor, and the pen pressure detecting portion in parallel with one another. Thus, when the electronic pen main body portion 3 is used, the resonance frequency of the resonance circuit is allowed to be changed according to an instruction of the user, and therefore the position detecting device side can be notified of a case where the side switch is not depressed and a case where the side switch is depressed.

In the present example, as depicted in FIG. 2A and FIG. 2B, dimensions of the pen tip side of the electronic pen main body portion 3 are configured to be substantially equal to dimensions of the pen tip side of the ballpoint pen refill 6. Specifically, a diameter of the ferrite core 32 disposed on the pen tip side of the electronic pen main body portion 3 is configured to be substantially equal to a diameter R1 of the pen tip portion 61 of the ballpoint pen refill 6. In addition, a total length of a length of a part of the tip end portion 34a of the core body 34 which part projects from the ferrite core 32 and a length of the first coil non-winding portion 32b of the ferrite core 32 is configured to be substantially equal to a length L1 of the pen tip portion 61 of the ballpoint pen refill 6, as depicted in FIGS. 2A and 2B.

In addition, a diameter of the coil winding portion 32a of the ferrite core 32 of the electronic pen main body portion 3 which winding portion is wound with the coil 31 and a diameter of the tubular body portion 33 are substantially equal to a diameter R2 of the ink housing portion 62 of the ballpoint pen refill 6, and are larger than the diameter R1 of the pen tip portion 61 (R2>R1). Incidentally, a diameter of the opening 2b of the casing 2 is smaller than the diameter R2. Hence, the coil winding portion 32a cannot project to the outside from the opening 2b.

In addition, as depicted in FIGS. 2A and 2B, a length (overall length) of the electronic pen main body portion in a state in which the ferrite core 32 and the tubular body portion 33 are coupled to each other and the core body 34 is fitted to the pen pressure detecting portion of the tubular body portion 33 through the through hole of the ferrite core 32 is selected to be equal to an overall length L2 of the ballpoint pen refill 6.

The tubular body portion 33 of the electronic pen main body portion 3 having the configuration as described above is fitted into the fitting portion 43a of the rotator 43 of the knock cam mechanism portion 4. The electronic pen main body portion 3 can be thereby housed within the casing 2. When the user uses the electronic pen 1 according to the present embodiment in conjunction with the position detecting device, the user depresses the end portion 42a of the knock bar 42. Then, as depicted in FIG. 1B, the tip end portion 34a of the core body 34 and a part of the first coil non-winding portion 32b of the ferrite core 32 in the electronic pen 1 project from the opening 2b of the casing 2. The user of the electronic pen 1 performs an operation of inputting an indicated position on the sensor of the position detecting device in this state.

Further, in the state depicted in FIG. 1B, by operating the operating element 2d provided to the casing 2, it is possible to switch connection/disconnection between the contact portions 2da and 2db provided to the operating element 2d and the terminals 35a and 35b provided to the tubular body portion 33 of the electronic pen main body portion 3. Thereby, as also described above, the resonance frequency of the resonance circuit included in the electronic pen main body portion 3 can be changed, and therefore the frequency of a signal transmitted from the resonance circuit can be switched.

After the usage of the electronic pen 1 is ended, the whole of the electronic pen main body portion 3 can be brought into a state of being housed within the hollow portion 2a of the casing 2, as depicted in FIG. 1A, by depressing the end portion 42a of the knock bar 42 again. At this time, the whole of the electronic pen main body portion 3 is housed within the hollow portion 2a of the casing 2, and the tip end portion 34a of the core body 34 of the electronic pen main body portion 3 is protected by the casing 2.

[Configuration of Operating Element 2d Part and Equivalent Circuit of Electronic Pen 1]

Figures 3A, 3B:
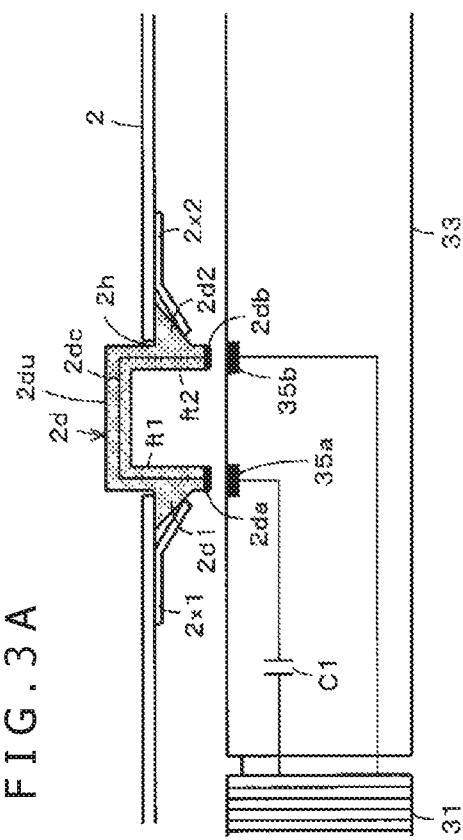
FIGS. 3A and 3B are diagrams of assistance in explaining a configuration (FIG. 3A) of an operating element part of the first embodiment of the electronic pen according to the present disclosure and an equivalent circuit (FIG. 3B) of the first embodiment of the electronic pen.

Next, a description will be made of a detailed constitution of the operating element 2d part of the side switch of the electronic pen 1 according to the first embodiment which detailed constitution is omitted in FIG. 1 and an equivalent circuit of the electronic pen 1 according to the first embodiment which equivalent circuit includes the side switch part. FIG. 3A is a diagram of assistance in explaining a detailed constitution of the operating element 2d part of the side switch of the electronic pen 1. FIG. 3B is a diagram of assistance in explaining an equivalent circuit of the electronic pen 1.

The operating element 2d is, for example, formed by a synthetic resin or the like, and has a certain degree of elastic force in a cured state. Therefore, in a state in which no force is applied to the operating element 2d, the operating element 2d maintains the shape depicted in FIGS. 1A and 1B and FIG. 3A. However, when a certain degree of force is applied to the leg portions ft1 and ft2, for example, the leg portions ft1 and ft2 can be displaced in a direction of the application of the force. In addition, as depicted in FIG. 3A, side surfaces of the two leg portions ft1 and ft2 of the operating element are provided with projections 2d1 and 2d2 that project outwardly.

A hole portion 2h for attaching the operating element 2d is provided in an attachment position of the operating element 2d of the casing 2. The hole portion 2h has an opening portion somewhat larger in a longitudinal direction and a lateral direction than the pressing portion 2du of the operating element 2d. Therefore, the leg portions ft1 and ft2 of the operating element 2d are pressed down to be inserted into the hole portion 2h, and the leg portions ft1 and ft2 are pushed into the hole portion 2h while deformed. Consequently, the projections 2d1 and 2d2 of the leg portions ft1 and ft2 are pushed into the casing 2 and positioned between the casing 2 and biasing members 2x1 and 2x2, and the leg portions ft1 and ft2 return to an original state. Thus, the operating element 2d can be attached to the casing 2 so as not to come off the casing 2 easily.

As depicted in FIG. 3A, the biasing members 2x1 and 2x2 such, for example, as leaf springs or the like, which biasing members are arranged on the left and right of the hole portion 2h of the casing 2, abut against the projections 2d1 and 2d2, and act to push up the operating element 2d toward the outside of the casing 2, or the upper side of FIG. 3A. Therefore, in a state in which the operating element 2d is not depressed by the user, the projections 2d1 and 2d2 remain in a predetermined position abutting against an inner wall surface of the casing 2, as depicted in FIG. 3A. On the other hand, when the pressing portion 2du of the operating element 2d is depressed, the operating element 2d is pushed down, and the contact portions 2da and 2db connected to each other by a conductor can be brought into contact with the terminals 35a and 35b of the electronic pen main body portion 3, as depicted in FIG. 1B.

Thus, in the electronic pen 1 according to the first embodiment, the operating element 2d, the biasing members 2x1 and 2x2, and the terminals 35a and 35b of the electronic pen main body portion 33 constitute a side switch. An equivalent circuit of the electronic pen 1 according to the first embodiment having the side switch is as depicted in FIG. 3B.

Specifically, the electronic pen 1 according to the first embodiment has a configuration formed by connecting the coil (inductor) 31, a capacitor Cf, a variable capacitance capacitor Cv constituting the pen pressure detecting portion, and a frequency changing capacitor C1 in parallel with each other. The coil 31, the capacitor Cf, the variable capacitance capacitor Cv, and the capacitor C1 are included in the electronic pen main body portion 3. In addition, a circuit section is provided which constitutes the side switch for performing switching as to whether or not to connect the capacitor C1 to the resonance circuit. The circuit section is a part constituted of the operating element 2d that has the contact portions 2da and 2db electrically connected to each other and is provided to the casing 2 and the terminals 35a and 35b that are provided so as to be exposed on the electronic pen main body portion 3.

Thus, connection/disconnection of the capacitor C1 to the resonance circuit can be selected by turning on/off the side switch. Hence, the frequency of a signal generated by the resonance circuit can be changed between a case where the capacitor C1 is connected to the resonance circuit and a case where the capacitor C1 is not connected to the resonance circuit. The position detecting device side can therefore be notified of two states in the case where the capacitor C1 is connected to the resonance circuit and the case where the capacitor C1 is not connected to the resonance circuit.

[Example of a Circuit Configuration of Position Detecting Device Used in Conjunction with Electronic Pen 1]

Next, referring to FIG. 4, a description will be made of an example of a circuit configuration and operation of the position detecting device used in conjunction with the electronic pen 1 according to the above-described embodiment. As also described above, the position detecting device according to the first embodiment is of the electromagnetic induction transmitting and receiving type.

The electronic pen 1 is formed by housing the electronic pen main body portion 3 within the casing 2, as described above. Specifically, as described with reference to FIG. 3B, the electronic pen main body portion 3 includes the resonance circuit formed by connecting the coil 31, the capacitor Cf, the variable capacitance capacitor Cv constituting the pen pressure detecting portion, and the frequency changing capacitor C1 in parallel with each other. The operating element 2d provided to the casing 2 and the terminals 35a and 35b provided so as to be exposed on the tubular body portion 33 of the electronic pen main body portion 3 constitute the side switch to enable selection of connection/disconnection of the capacitor C1 to the resonance circuit.

On the other hand, in the position detecting device 400, a position detecting coil 410 is formed by stacking an X-axis direction loop coil group 411 and a Y-axis direction loop coil group 412. The loop coil groups 411 and 412 are, for example, constituted of n and m rectangular loop coils, respectively. The loop coils constituting the respective loop coil groups 411 and 412 are disposed so as to be arranged at equal intervals and sequentially overlap each other.

In addition, the position detecting device 400 is provided with a selection circuit 413 to which the X-axis direction loop coil group 411 and the Y-axis direction loop coil group 412 are connected. The selection circuit 413 sequentially selects one loop coil among the two loop coil groups 411 and 412.

The position detecting device 400 further includes an oscillator 421, a current driver 422, a switch connection circuit 423, a receiving amplifier 424, a detector 425, a low-pass filter 426, a sample and hold circuit 427, an A/D (Analog to Digital) converter circuit 428, a synchronous detector 429, a low-pass filter 430, a sample and hold circuit 431, an A/D converter circuit 432, and a processing control circuit 433. The processing control circuit 433 is formed by a microcomputer, for example.

The oscillator 421 generates an alternating-current signal of a frequency f0. The oscillator 421 then supplies the generated alternating-current signal to the current driver 422 and the synchronous detector 429. The current driver 422 converts the alternating-current signal supplied from the oscillator 421 into a current, and sends out the current to the switch connection circuit 423. The switch connection circuit 423 switches a connection destination (a transmitting side terminal T or a receiving side terminal R) to which to connect the loop coil selected by the selection circuit 413, under control of the processing control circuit 433. Of the connection destinations, the transmitting side terminal T is connected with the current driver 422, and the receiving side terminal R is connected with the receiving amplifier 424.

An induced voltage generated in the loop coil selected by the selection circuit 413 is sent to the receiving amplifier 424 via the selection circuit 413 and the switch connection circuit 423. The receiving amplifier 424 amplifies the induced voltage supplied from the loop coil, and sends out the amplified induced voltage to the detector 425 and the synchronous detector 429.

The detector 425 detects the induced voltage generated in the loop coil, that is, a received signal, and sends out the received signal to the low-pass filter 426. The low-pass filter 426 has a cutoff frequency sufficiently lower than the above-mentioned frequency f0. The low-pass filter 426 converts the output signal of the detector 425 into a direct-current signal, and sends out the direct-current signal to the sample and hold circuit 427. The sample and hold circuit 427 holds a voltage value of the output signal of the low-pass filter 426 in predetermined timing, specifically predetermined timing during a reception period, and sends out the voltage value to the A/D (Analog to Digital) converter circuit 428. The A/D converter circuit 428 converts the analog output of the sample and hold circuit 427 into a digital signal, and outputs the digital signal to the processing control circuit 433.

Meanwhile, the synchronous detector 429 performs synchronous detection of the output signal of the receiving amplifier 424 by the alternating-current signal from the oscillator 421, and sends out, to the low-pass filter 430, a signal having a level corresponding to a phase difference between the output signal of the receiving amplifier 424 and the alternating-current signal from the oscillator 421. The low-pass filter 430 has a cutoff frequency sufficiently lower than the frequency f0. The low-pass filter 430 converts the output signal of the synchronous detector 429 into a direct-current signal, and sends out the direct-current signal to the sample and hold circuit 431. The sample and hold circuit 431 holds a voltage value of the output signal of the low-pass filter 430 in predetermined timing, and sends out the voltage value to the A/D (Analog to Digital) conversion circuit 432. The A/D converter circuit 432 converts the analog output of the sample and hold circuit 431 into a digital signal, and outputs the digital signal to the processing control circuit 433.

The processing control circuit 433 controls various parts of the position detecting device 400. Specifically, the processing control circuit 433 controls the selection of a loop coil in the selection circuit 413, the switching of the switch connection circuit 423, and the timing of the sample and hold circuits 427 and 431. The processing control circuit 433 makes a radio wave transmitted from the X-axis direction loop coil group 411 and the Y-axis direction loop coil group 412 for a certain transmission duration (continuous transmission interval) on the basis of the input signals from the A/D converter circuits 428 and 432.

A radio wave transmitted (fed back) from the electronic pen 1 generates an induced voltage in each of the loop coils of the X-axis direction loop coil group 411 and the Y-axis direction loop coil group 412. The processing control circuit 433 calculates the coordinate values of an indicated position in an X-axis direction and a Y-axis direction which position is indicated by the electronic pen 1 on the basis of the level of the voltage value of the induced voltage generated in each of the loop coils. In addition, the processing control circuit 433 detects a pen pressure and the on/off state of the side switch on the basis of the level of the signal corresponding to the phase difference between the transmitted radio wave and the received radio wave.

That is, the frequency of the signal transmitted from the resonance circuit of the electronic pen 1 changes according to a change in the capacitance of the variable capacitance capacitor Cv as the pen pressure detecting portion. The capacitance of the capacitor C1 is determined such that frequency ranges of the signal transmitted from the resonance circuit of the electronic pen 1 when the side switch is on and when the side switch is off do not overlap each other. Therefore, when signal transmission and reception can be mutually performed between the electronic pen 1 and the position detecting device 400, the processing control circuit 433 can properly detect the on/off state of the side switch on the basis of the level of the signal corresponding to the phase difference between the transmitted radio wave and the radio wave received from the electronic pen 1.

Moreover, the frequency ranges of the signal transmitted from the resonance circuit of the electronic pen 1 when the side switch is on and when the side switch is off do not overlap each other. Therefore, both when the side switch is on and when the side switch is off, the pen pressure can also be detected accurately on the basis of the level of the signal corresponding to the phase difference between the radio wave transmitted from the position detecting device 400 and the radio wave received from the electronic pen 1.

Thus, in the position detecting device 400, the processing control circuit 433 detects the position of the electronic pen 1 that has approached the position detecting device 400. Then, by detecting the phase of the received signal, it is possible to obtain information about the pen pressure value of the electronic pen 1 and the on/off state of the side switch. Suppose that the electronic pen 1 and the position detecting device 400 are used as an input device of a personal computer. In this case, by performing an operation on the position detecting device 400 using the electronic pen 1, it is possible to input rendering data so as to perform rendering at a position intended by the user on a display screen with a pen pressure intended by the user.

In addition, by performing an operation on the position detecting device 400 using the electronic pen 1, it is possible to select an icon and perform processing corresponding to the icon. In addition, by bringing the electronic pen 1 close to the position detecting device 400 and turning on the side switch, it is possible, for example, to display a pull-down menu and select a menu item, as in so-called mouse left clicking operation.

Because the electronic pen main body portion 3 can be thinned, the electronic pen main body portion 3 can be configured to be compatible with a refill for a commercially available ballpoint pen. When the electronic pen main body portion 3 is configured to be compatible with a refill for a commercially available ballpoint pen, there is an advantage in that the casing 2 of the electronic pen 1 can be used as the casing of the commercially available ballpoint pen. In this case, when the electronic pen main body portion 3 having the configuration of the refill is used, a side switch function can be realized easily by providing the side switch operating element to the casing of the electronic pen 1. When a refill for a ballpoint pen is housed in the casing 2, the electronic pen 1 can of course be used as a ballpoint pen.

Second Embodiment

Figure 4:
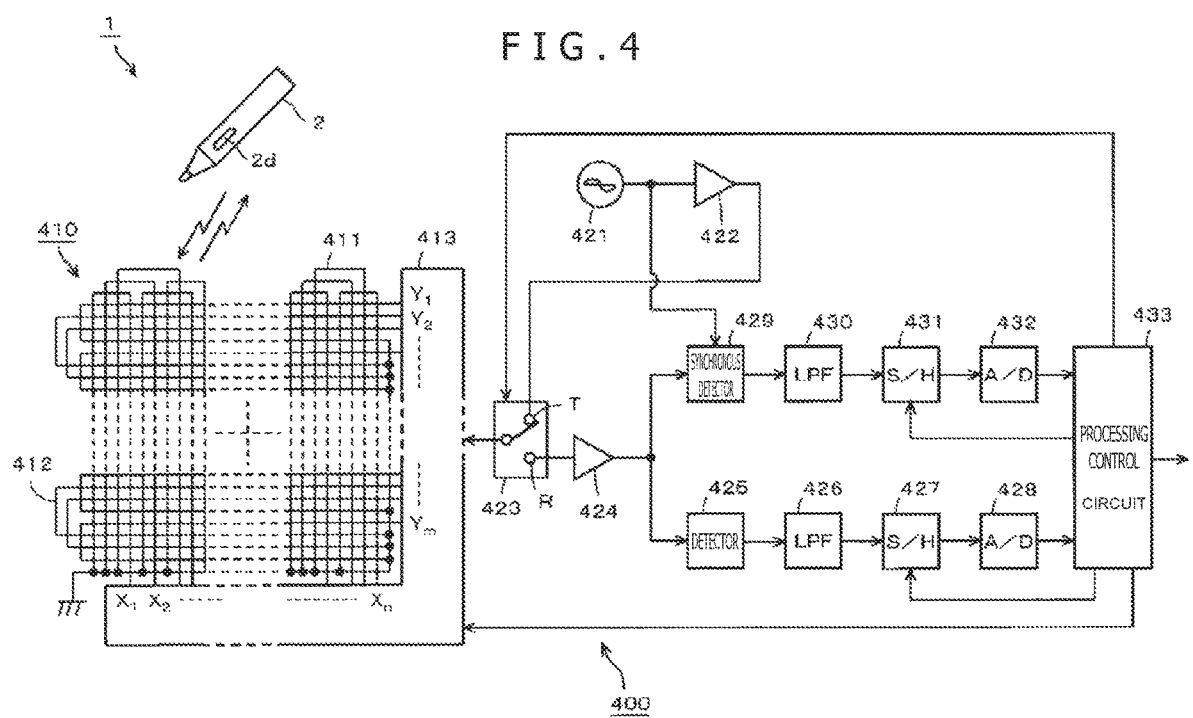
FIG. 4 is a diagram depicting a circuit configuration of a position detecting device used in conjunction with the first embodiment of the electronic pen according to the present disclosure.
Figure 5A:
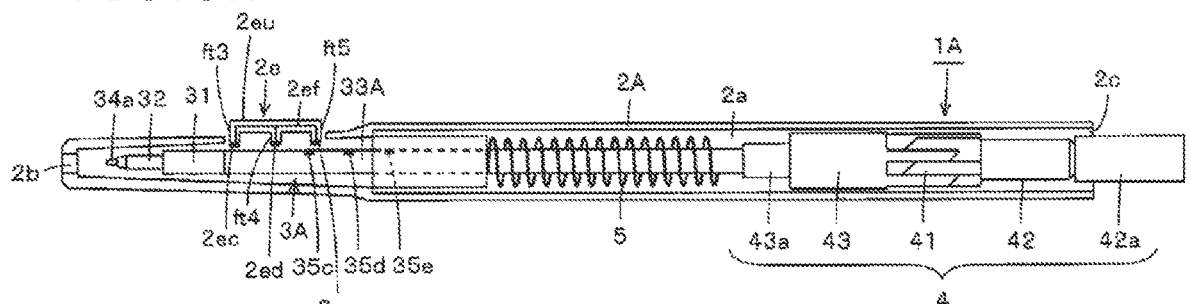
FIGS. 5A and 5B are diagrams depicting an example of a configuration of a second embodiment of the electronic pen according to the present disclosure.
Figure 5B:
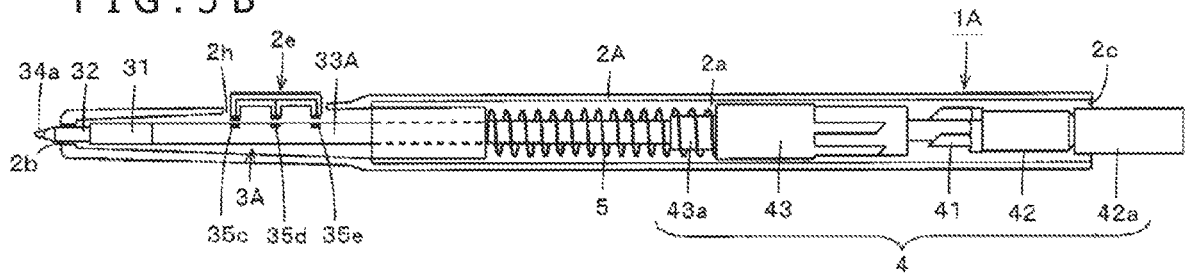

FIGS. 5A and 5B are diagrams depicting an example of a configuration of a second embodiment of the electronic pen according to the present disclosure. As with the electronic pen 1 according to the foregoing first embodiment, an electronic pen 1A according to the second embodiment is used with a position detecting device of the electromagnetic induction transmitting and receiving type. The electronic pen 1A according to the second embodiment therefore has a similar basic configuration to that of the electronic pen 1 according to the first embodiment described with reference to FIGS. 1A to 4. However, constituent parts implementing a side switch are different from those of the electronic pen 1 according to the first embodiment. Therefore, in FIGS. 5A and 5B, parts configured in a similar manner to those of the electronic pen 1 according to the first embodiment are identified by the same reference numerals, and repeated description of those parts will be omitted. Description will be made centering on parts having different configurations.

FIG. 5A depicts a state in which the whole of an electronic pen main body portion 3A is housed within a hollow portion 2a of a casing 2A. FIG. 5B depicts a state in which the pen tip side of the electronic pen main body portion 3A is projected from an opening 2b of the casing 2A by a knock cam mechanism portion 4. Also in the case of the electronic pen 1A according to the second embodiment, as in the electronic pen 1 according to the foregoing first embodiment, a hole portion 2h is provided in a side surface portion of the casing 2A of the electronic pen 1A, the side surface portion being near to the opening 2b. A side switch operating element 2e is provided in the hole portion 2h.

The operating element 2e has a configuration formed by connecting three short leg portions ft3, ft4, and ft5 to each other by one long pressing portion 2eu. Contact portions 2ec, 2ed, and 2ee formed by conductors are provided to end portions of the three leg portions ft3, ft4, and ft5. These contact portions 2ec, 2ed, and 2ee are connected to each other by a conductor 2ef. Incidentally, as will be described later in detail, the middle leg portion ft4 of the operating element 2e is made slightly longer than the leg portions ft3 and ft5 on both sides of the middle leg portion ft4. In addition, though not depicted in FIG. 5, the operating element 2e is prevented from falling off easily from the casing 2A and is always biased toward the outside of the casing 2A, but can be pushed to the inside of the casing 2A when the user performs a depressing operation.

On the other hand, terminals 35c, 35d, and 35e are provided so as to be exposed on a side surface of a tubular body portion 33A of the electronic pen main body portion 3A. Then, suppose that as depicted in FIG. 5A, the whole of the electronic pen main body portion 3A is housed within the hollow portion 2a of the casing 2A. In this case, even when the operating element 2e is pushed into the casing 2A, the contact portions 2ec, 2ed, and 2ee provided to the operating element 2e do not come into contact with the terminals 35c, 35d, and 35e.

On the other hand, suppose that as depicted in FIG. 5B, the knock cam mechanism portion 4 has set the pen tip side of the electronic pen main body portion 3A in a state of projecting from the opening 2b of the casing 2A. In this case, when a front side (contact portion 2ec side) of the operating element 2e is depressed, the contact portions 2ec and 2ed provided to the operating element 2e come into contact with the terminals 35c and 35d, so that electric connection is established between the terminal 35c and the terminal 35d. Conversely, when a rear side (contact portion 2ee side) of the operating element 2e is depressed, the contact portions 2ed and 2ee provided to the operating element 2e come into contact with the terminals 35d and 35e, so that electric connection is established between the terminal 35d and the terminal 35e.

Thus, in the case of the electronic pen 1A according to the second embodiment, the operating element 2e provided to the casing 2A and the terminals 35c, 35d, and 35e provided to the electronic pen main body portion 3A constitute a side switch. As also described above, the middle leg portion ft4 of the operating element 2e is made slightly longer than the leg portions ft3 and ft5 on both sides of the middle leg portion ft4. Therefore, in a state in which the operating element 2e is not operated, at least the contact portions 2ec and 2ee of the operating element 2e can each be maintained in a state of not being in contact with either of the corresponding terminals 35c and 35e of the electronic pen main body portion 3A. In this state, no electric connection is established between any of the terminals 35c, 35d, and 35e of the electronic pen main body portion 3A.

When the leg portion ft3 side of the operating element 2e is depressed, on the other hand, the operating element 2e tilts to the leg portion ft3 side as in the case of a seesaw with the leg portion ft4 as a fulcrum, and the contact portions 2ec and 2ed of the operating element 2e are in contact with the terminals 35c and 35d of the electronic pen main body portion 3A. In this case, electric connection is established between the terminal 35c and the terminal 35d of the electronic pen main body portion 3A. Conversely, when the leg portion ft5 side of the operating element 2e is depressed, the operating element 2e tilts to the leg portion ft5 side as in the case of a seesaw with the leg portion ft4 as a fulcrum, and the contact portions 2ed and 2ee of the operating element 2e are in contact with the terminals 35d and 35e of the electronic pen main body portion 3A. In this case, electric connection is established between the terminal 35d and the terminal 35e of the electronic pen main body portion 3A.

Thus, in the case of the electronic pen 1A according to the second embodiment, the side switch including the operating element 2e enables selection of three connection states of the terminals 35c, 35d, and 35e of the electronic pen main body portion 3A. Specifically, it is possible to select three states that are a state in which no electric connection is established between any of the terminals, a state in which electric connection is established between the terminal 35c and the terminal 35d, and a state in which electric connection is established between the terminal 35d and the terminal 35e.

[Configuration of Operating Element 2e Part and Equivalent Circuit of Electronic Pen 1a]

Next, a description will be made of a detailed constitution of the operating element 2e part of the side switch of the electronic pen 1A according to the second embodiment which detailed constitution is omitted in FIG. 5 and an equivalent circuit of the electronic pen 1A according to the second embodiment which equivalent circuit includes the side switch part. FIG. 6A is a diagram of assistance in explaining a detailed constitution of the operating element 2e part of the side switch of the electronic pen 1A. FIG. 6B is a diagram of assistance in explaining an equivalent circuit of the electronic pen 1A.

The operating element 2e has the three leg portions ft3, ft4, and ft5. The contact portions 2ec, 2ed, and 2ee formed by conductors are provided to the end portions of the three leg portions ft3, ft4, and ft5. These contact portions 2ec, 2ed, and 2ee are connected to each other by the conductor 2ef. Except that the operating element 2e thus has the configuration including the three leg portions ft3, ft4, and ft5, the other configuration of the operating element 2e is similar to that of the operating element 2d according to the first embodiment. Specifically, the operating element 2e is also formed by a synthetic resin or the like, and also has a certain degree of elastic force in a cured state. Therefore, in a state in which no force is applied to the operating element 2e, the operating element 2e maintains the shape depicted in FIGS. 5A and 5B and FIG. 6A. However, when a certain degree of force is applied to the leg portions ft3 and ft5, for example, the leg portions ft3 and ft5 can be displaced in a direction of application of the force.

In addition, side surfaces of the leg portions ft3 and ft5 of the operating element 2e are provided with projections 2e1 and 2e2 projecting outwardly. A hole portion 2h for attaching the operating element 2e is provided in an attachment position of the operating element 2e of the casing 2A. The hole portion 2h has an opening portion somewhat larger in a longitudinal direction and a lateral direction than the pressing portion 2eu of the operating element 2e. Therefore, the leg portions ft3, ft4, and ft5 of the operating element 2e are pressed down to be inserted into the hole portion 2h, and the leg portions ft3 and ft5 are pushed into the hole portion 2h while deformed. Consequently, the projections 2e1 and 2e2 of the leg portions ft3 and ft5 are pushed into the casing 2A and positioned between the casing 2A and biasing members 2y1 and 2y2, and the leg portions ft3 and ft5 return to an original state. Thus, the operating element 2e can be attached to the casing 2A so as not to come off the casing 2A easily.

As depicted in FIG. 6A, the biasing members 2y1 and 2y2 such, for example, as leaf springs or the like, which biasing members are arranged on the left and right of the hole portion 2h of the casing 2A, abut against the projections 2e1 and 2e2, and act to push up the operating element 2e toward the outside of the casing 2, or the upper side of FIG. 6A. Therefore, in a state in which the operating element 2e is not depressed by the user, the projections 2e1 and 2e2 remain in a predetermined position abutting against an inner wall surface of the casing 2A, as depicted in FIG. 6A.

By depressing the pressing portion 2du of the operating element 2e, it is possible to operate the operating element 2e in a so-called seesaw manner, as described above. Thus, when the contact portions 2ec and 2ed of the operating element 2e are brought into contact with the terminals 35c and 35d of the electronic pen main body portion, the terminal 35c and the terminal 35d can be electrically connected to each other. Conversely, when the contact portions 2ed and 2ee of the operating element 2e are brought into contact with the terminals 35d and 35e of the electronic pen main body portion, the terminal 35d and the terminal 35e can be electrically connected to each other.

A frequency changing capacitor C2 is provided between the terminal 35c and the terminal 35d. A frequency changing capacitor C3 is provided between the terminal 35d and the terminal 35e. It is therefore possible to form a state in which the capacitor C2 is connected in parallel with a resonance circuit included in the electronic pen main body portion 3A, a state in which the capacitor C3 is connected in parallel with the resonance circuit, and a state in which neither of the capacitor C2 nor the capacitor C3 is connected in parallel with the resonance circuit.

Thus, in the electronic pen 1A according to the second embodiment, the operating element 2e, the biasing members 2y1 and 2y2, and the terminals 35c, 35d, and 35e of the electronic pen main body portion 33 constitute a side switch. An equivalent circuit of the electronic pen 1 according to the second embodiment having the side switch is as depicted in FIG. 6B.

The electronic pen 1A according to the second embodiment has a configuration formed by connecting a coil (inductor) 31, a capacitor Cf, a variable capacitance capacitor Cv constituting a pen pressure detecting portion, and the frequency changing capacitors C2 and C3 in parallel with each other. In addition, the operating element 2e and the terminals 35c, 35d, and 35e disposed on the side surface of the electronic pen main body portion 3A constitute a side switch.

When the operating element 2e is not operated, an electrically non-connected state can be established between all of the terminals 35c, 35d, and 35e of the electronic pen main body portion. In addition, by operating the operating element 2e, it is possible to switch between a case where the capacitor C2 is connected in parallel with the resonance circuit and a case where the capacitor C3 is connected in parallel with the resonance circuit. Hence, the frequency of a signal generated by the resonance circuit can be changed between the case where neither of the capacitors C2 and C3 is connected to the resonance circuit, the case where the capacitor C2 is connected to the resonance circuit, and the case where the capacitor C3 is connected to the resonance circuit. These three states can be notified to the position detecting device 400.

As with the electronic pen 1 according to the foregoing first embodiment, the electronic pen 1A according to the second embodiment is used to input information to the position detecting device 400 depicted in FIG. 4. When signal transmission and reception can be mutually performed between the electronic pen 1A and the position detecting device 400, the processing control circuit 433 of the position detecting device 400 can properly determine the state of the side switch on the basis of the level of a signal corresponding to a phase difference between a transmitted radio wave and a radio wave received from the electronic pen 1A.

[Other Configuration Examples of Side Switch]

Description will be made of two other examples in which a side switch is configured using terminals arranged so as to be exposed on the electronic pen main body portion 3.

FIG. 7 is a diagram of assistance in explaining another example of the electronic pen according to the first embodiment, in which example the electronic pen main body portion 3 of the first embodiment is used as it is, but the shape of an operating element 2dA is changed. As depicted in FIG. 7, the operating element 2dA in the present example is formed by connecting two leg portions ft6 and ft7 to each other by a pressing portion 2dAu. Conductor contact portions 2dAa and 2dAb are provided to end portions of the leg portions ft6 and ft7. These contact portions 2dAa and 2dAb are connected to each other by a conductor 2dAc. Incidentally, the tubular body portion 33 of the electronic pen main body portion 3 is provided with the terminals 35a and 35b so as to be exposed on the tubular body portion 33 at positions corresponding to the contact portions 2dAa and 2dAb provided to the end portions of the leg portions ft6 and ft7 of the operating element 2dA.

The leg portion ft7 of the operating element 2dA in the present example is made longer than the leg portion ft6. The contact portion 2dAb of the leg portion ft7 is always in contact with the tubular body portion 33 of the electronic pen main body portion 3. Side surfaces of the leg portions ft6 and ft7 are provided with projections 2dA1 and 2dA2 that project outwardly as depicted in FIG. 7. Further, in the present example, a biasing member 2z1 such as a leaf spring or the like is provided only on the projection 2dA1 side of the operating element 2dA, and the leg portion ft6 is always biased in a direction from the inside of the casing 2 toward the outside. In this case, the leg portion ft7 is longer than the leg portion ft6, and therefore does not need to be biased by a leaf spring.

Hence, when the leg portion ft6 side of the operating element 2dA is depressed in a state in which the pen tip of the electronic pen main body portion 3 projects from the opening 2b of the casing 2, the contact portion 2dAa of the leg portion ft6 and the terminal 35a can be brought into contact with each other. The contact portion 2dAb of the leg portion ft7 and the terminal 35b are in contact with each other. Thus, electric connection is established between the terminal 35a and the terminal 35b, so that the capacitor C1 can be connected in parallel with the resonance circuit. That is, an equivalent circuit of the electronic pen in the present example is the same as depicted in FIG. 3B.

In the example depicted in FIG. 7, as compared with the side switch using the operating element 2d of the electronic pen 1 according to the first embodiment described with reference to FIG. 3A, leaf springs do not need to be provided to both of the leg portions, and therefore the configuration of the side switch can be simplified.

FIGS. 8A to 8D are diagrams of assistance in explaining another example of the electronic pen according to the first embodiment, in which example a manner of arranging the terminals provided to the tubular body portion 33 of the electronic pen main body portion 3 or 3A is changed. In the foregoing first and second embodiments, as depicted in FIG. 3A, FIG. 6A, and the like, the tubular body portion 33 of the electronic pen main body portion 3 or 3A is provided with two terminals or three terminals in the longitudinal direction of the tubular body portion 33. However, as depicted in FIG. 8A, in the present example, terminals 35g and 35h provided to the tubular body portion 33 of the electronic pen main body portion 3 are provided so as to be arranged in a direction intersecting the longitudinal direction of the tubular body portion 33.

An operating element 2f having contact portions corresponding to the terminals 35g and 35h thus provided to the tubular body portion 33 of the electronic pen main body portion 3 is as depicted in FIGS. 8B and 8C. FIG. 8B is a diagram of the operating element 2f as viewed from a side where leg portions are arranged. FIG. 8C is a diagram of the operating element 2f as viewed from a direction indicated by an arrow fr. FIG. 8D is a diagram of the operating element 2f as viewed from a direction indicated by an arrow bk.

As depicted in FIGS. 8B and 8C, the operating element 2f is provided with pressing leg portions ft8 and ft9 at positions corresponding to the terminals 35g and 35h provided to the tubular body portion 33 of the electronic pen main body portion 3, and is provided with contact portions 2fg and 2fh formed by conductors at end portions of the pressing leg portions ft8 and ft9. As depicted in FIGS. 8B and 8D, the operating element 2f is further provided with attachment leg portions 2fi and 2fj on an opposite side from a side where the pressing leg portions ft8 and ft9 are arranged. As depicted in FIG. 8D, the attachment leg portions 2fi and 2fj are provided with attachment projections formed so as to project outwardly from end portions of the attachment leg portions 2fi and 2fj.

The casing 2 of the electronic pen 1 is provided with pressing hole portions at positions corresponding to the pressing leg portions ft8 and ft9 of the operating element 2f, and is provided with attachment hole portions at positions corresponding to the attachment leg portions 2fi and 2fj. The pressing hole portions have a size such that the pressing leg portions ft8 and ft9 are not in contact with the casing 2 in order that the contact portions 2fg and 2fh provided to the end portions of the pressing leg portions ft8 and ft9 can come into contact with the terminals 35g and 35h provided to the tubular body portion 33.

On the other hand, the attachment hole portions have a size such that the projecting portions of the attachment leg portions 2fi and 2fj catch the attachment hole portions. When the attachment leg portions 2fi and 2fj are pushed in from an upper side, the attachment leg portions 2fi and 2fj are displaced so as to approach each other, the projecting portions of the attachment leg portions 2fi and 2fj are housed within the casing 2, and thereafter the attachment leg portions 2fi and 2fj return to an original position. Thus, the projecting portions of the attachment leg portions 2fi and 2fj catch the casing 2 within the casing 2 to prevent easy removal of the operating element 2f.

The attachment leg portions 2fi and 2fj have a certain length (width) in the longitudinal direction (front-rear direction) of the operating element 2f, and therefore always act to raise the side of the pressing leg portions ft8 and ft9 of the operating element 2f. Thus, without the use of biasing members such as leaf springs or the like, the contact portions 2fg and 2fh of the pressing leg portions ft8 and ft9 are not in contact with the terminals 35g and 35h of the tubular body portion 33 in a state in which no force is applied to the operating element 2f. When a pressing force is applied to the operating element 2f, on the other hand, the side of the pressing leg portions ft8 and ft9 of the operating element 2f is displaced in a direction in which the operating element 2f is pressed, and the contact portions 2fg and 2fh of the pressing leg portions ft8 and ft9 come into contact with the terminals 35g and 35h of the tubular body portion 33.

The electronic pen 1 having the equivalent circuit depicted in FIG. 3A can be implemented also in another example depicted in FIGS. 8A to 8D. Incidentally, in the example depicted in FIGS. 8A to 8D, the electronic pen 1A having the equivalent circuit depicted in FIG. 6A can be realized when pressing leg portions are allocated with the attachment leg portions 2fi and 2fj interposed therebetween such that the attachment leg portions 2fi and 2fj serve as a fulcrum. In this case, it suffices to provide the tubular body portion 33 of the electronic pen main body portion 3 with another pair of terminals in a form similar to that of the terminals 35g and 35h depicted in FIG. 8A so as to correspond to the newly provided pressing leg portions.

Third Embodiment

In the case of the electronic pen main body portion 3 or 3A according to the foregoing first or second embodiment, a side switch is implemented by providing the two terminals 35a and 35b or the three terminals 35c, 35d, and 35e in such a manner as to be exposed on the tubular body portion 33 or 33A. In this third embodiment, the tubular body portion of the electronic pen main body portion is provided with a switch part, and an operation receiving portion of the switch part is made operable by an operating element provided to the casing of the electronic pen.

Figure 9A:
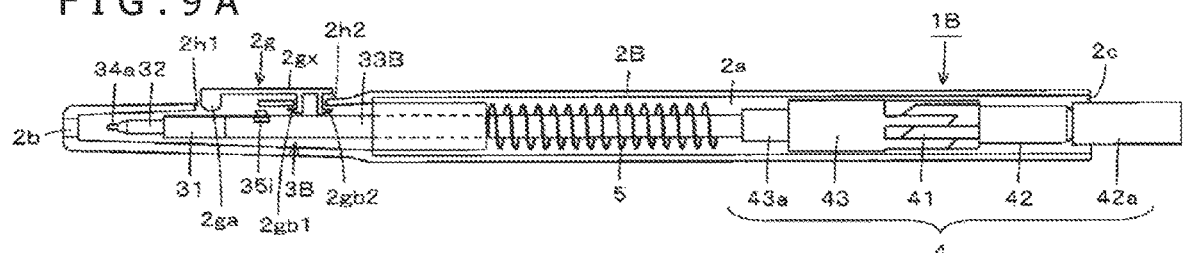
FIGS. 9A and 9B are diagrams depicting an example of a configuration of a third embodiment of the electronic pen according to the present disclosure.
Figure 9B:
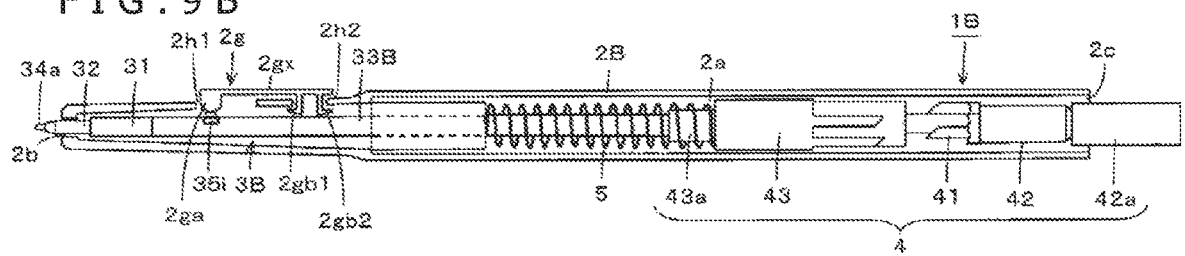

FIGS. 9A and 9B are diagrams depicting an example of a configuration of a third embodiment of the electronic pen according to the present disclosure. The electronic pen 1B according to the present third embodiment has a similar basic configuration to that of the electronic pen 1 according to the first embodiment described with reference to FIGS. 1A to 4. However, constituent parts implementing a side switch are different from those of the electronic pen 1 according to the first embodiment. Therefore, in FIGS. 9A and 9B, parts configured in a similar manner to those of the electronic pen 1 according to the first embodiment are identified by the same reference numerals, and repeated description of those parts will be omitted. Description will be made centering on parts having different configurations.

FIG. 9A depicts a state in which the whole of an electronic pen main body portion 3B is housed within a hollow portion 2a of a casing 2B. FIG. 9B depicts a state in which the pen tip side of the electronic pen main body portion 3B is projected from an opening 2b of the casing 2B by a knock cam mechanism portion 4. In the case of the electronic pen 1B according to the present third embodiment, two hole portions 2h1 and 2h2 are provided in a side surface portion of the casing 2B of the electronic pen 1B, the side surface portion being near to the opening 2b, and a side switch operating element 2g is disposed using the two hole portions 2h1 and 2h2.

As depicted in FIGS. 9A and 9B, the operating element 2g is formed by providing an operating plate portion 2gx with a pressing portion 2ga and attachment leg portions 2gb1 and 2gb2. As will also be described later, the pressing portion 2ga is for depressing an operation receiving portion of a switch part provided to a tubular body portion 33B of the electronic pen main body portion 3B. As depicted in FIGS.

9A and 9B, the attachment leg portions $2gb1$ and $2gb2$ are provided with attachment projections formed so as to project outwardly from end portions of the attachment leg portions $2gb1$ and $2gb2$.

On the other hand, a side surface of the tubular body portion 33B of the electronic pen main body portion 3B is provided with a switch part $35i$ such that an operation receiving portion of the switch part $35i$ is exposed. Then, as depicted in FIG. 9A, suppose that the whole of the electronic pen main body portion 3B is housed within the hollow portion $2a$ of the casing 2B. In this case, even when the pressing portion $2ga$ of the operating element $2g$ is pushed into the casing 2B, the pressing portion $2ga$ provided to the operating element $2g$ does not depress the operation receiving portion of the switch part $35i$.

On the other hand, suppose that as depicted in FIG. 9B, the knock cam mechanism portion 4 has set the pen tip side of the electronic pen main body portion 3B in a state of projecting from the opening $2b$ of the casing 2B. In this case, when the pressing portion $2ga$ of the operating element $2g$ is depressed, the pressing portion $2ga$ of the operating element $2g$ depresses the operation receiving portion of the switch part $35i$ provided to the tubular body portion 33B of the electronic pen main body portion 3B. The switch part $35i$ is thereby set in an on state. In addition, when the depression of the pressing portion $2ga$ of the operating element $2g$ is ended (when the depression is released), the depression of the operation receiving portion of the switch part $35i$ by the pressing portion $2ga$ of the operating element $2g$ is also released, and the switch part $35i$ is thereby turned off.

Thus, in the case of the electronic pen 1B according to the present third embodiment, the operating element $2g$ provided to the casing 2B and the switch part $35i$ provided to the electronic pen main body portion 3B constitute a side switch. When the switch part can be provided to the tubular body portion 33B of the electronic pen main body portion 3B, a side switch can be implemented which can properly receive operating input of the user by the switch part and properly perform on/off control.

[Configuration of Operating Element $2g$ Part]

Next, a description will be made of a detailed constitution of the operating element $2g$ part of the side switch of the electronic pen 1B according to the third embodiment. FIG. 10A is a diagram of assistance in explaining a detailed constitution of the operating element $2g$ part of the side switch of the electronic pen 1B. FIG. 10B is a diagram of assistance in explaining another example of the detailed constitution of the operating element $2g$ part of the side switch of the electronic pen 1B.

In the case of the electronic pen 1B according to the present third embodiment, as depicted in FIGS. 10A and 10B, the casing 2B of the electronic pen 1B is provided with a pressing hole portion $2h1$ at a position corresponding to the pressing portion $2ga$ of the operating element $2g$. The casing 2B of the electronic pen 1B is further provided with an attachment hole portion $2h2$ at a position corresponding to the attachment leg portions $2gb1$ and $2gb2$ of the operating element $2g$. The pressing hole portion $2h1$ has a length such that the pressing portion $2ga$ is not in contact with the casing 2B in order that the pressing portion $2ga$ can depress the operation receiving portion of the switch part $35i$ provided to the tubular body portion 33B of the electronic pen main body portion 3B.

On the other hand, the attachment hole portion $2h2$ has a size such that the projecting portions of the attachment leg portions $2gb1$ and $2gb2$ catch the attachment hole portion $2h2$. When the attachment leg portions $2gb1$ and $2gb2$ are pushed into the attachment hole portion $2h2$ from an upper side, the attachment leg portions $2gb1$ and $2gb2$ are deformed, the projecting portions enter the inside of the casing 2B, and the attachment leg portions $2gb1$ and $2gb2$ return to an original state. Thus, the operating element $2g$ can be attached to the casing 2B so as not to come off the casing 2B easily.

The attachment leg portions $2gb1$ and $2gb2$ are arranged at predetermined intervals in the longitudinal direction (front-rear direction) of the operating element $2g$. The attachment leg portions $2gb1$ and $2gb2$ therefore always act to raise the side of the pressing portion $2ga$ of the operating element $2g$. Thus, without the use of members such as leaf springs or the like, the pressing portion $2ga$ of the operating element $2g$ does not press the operation receiving portion of the switch part of the tubular body portion 33B in a state in which no force is applied to the operating element $2g$. On the other hand, when a pressing force is applied onto the pressing portion of the operating element $2g$, the pressing portion $2ga$ part of the operating element $2g$ is displaced in a direction in which the pressing portion is pressed, and the pressing portion $2ga$ depresses the operation receiving portion of the switch part $35i$ of the tubular body portion 33B.

Incidentally, the operation receiving portion of the switch part provided to the tubular body portion 33B is also normally pushed up in a direction of an upper portion thereof that receives operation. That is, the switch part $35i$ itself also act to push up the pressing portion $2ga$ of the operating element $2g$. Therefore, the operating element $2g$ according to the present third embodiment also does not need to be provided with a biasing member such as a leaf spring or the like that raises the operating element $2g$ toward the outside of the casing 2B.

In addition, as is clear from a comparison between FIGS. 10A and 10B, a difference between the operating element $2g$ depicted in FIG. 10A and an operating element $2gA$ depicted in FIG. 10B is a difference between the presence and absence of a projecting portion $2gc$. As depicted in FIG. 10B, the operating element $2gA$ having the projecting portion $2gc$ can prevent the pressing portion $2ga$ part of the operating element $2gA$ from being displaced in a direction of going away from the casing 2B more than necessary. It is therefore possible to prevent the operating element $2gA$ from coming off the casing 2B, and prevent damage to the operating element $2gA$.

An equivalent circuit of the electronic pen 1B according to the third embodiment described with reference to FIGS. 9A and 9B and FIGS. 10A and 10B is also as depicted in FIG. 3B. Incidentally, in the case of the third embodiment depicted in FIGS. 9A and 9B and FIGS. 10A and 10B, the electronic pen having the equivalent circuit depicted in FIG. 6A can be implemented by attaching the operating element $2g$ such that the attachment leg portions $2gb1$ and $2gb2$ serve as a fulcrum. In this case, it suffices to provide the tubular body portion 33B of the electronic pen main body portion 3B with a switch part similar to the switch part $35i$ depicted in FIGS. 10A and 10B so as to correspond to a newly provided pressing portion.

It is to be noted that while in the present third embodiment, a description has been made of a case where the electronic pen main body portion 3B provided with one switch part is used, there is no limitation to this. By providing two switch parts to the electronic pen main body portion, and using an operating element of the so-called seesaw type as in the foregoing second embodiment, it is possible to use a side switch that allows depressing operation of the operation receiving portion of one of the two switch parts.

Modifications

Description has been made supposing that the electronic pen 1B according to the third embodiment described with reference to FIGS. 9A and 9B and FIGS. 10A and 10B houses only the electronic pen main body portion 3B within the casing 2B. However, there is no limitation to this. When the casing is replaced with a thick casing, a so-called two-color pen can be formed which simultaneously houses the ballpoint pen refill 6 and the electronic pen main body portion 3B. The present disclosure is applicable also to cases where a two-color pen is thus formed.

Figure 11A:
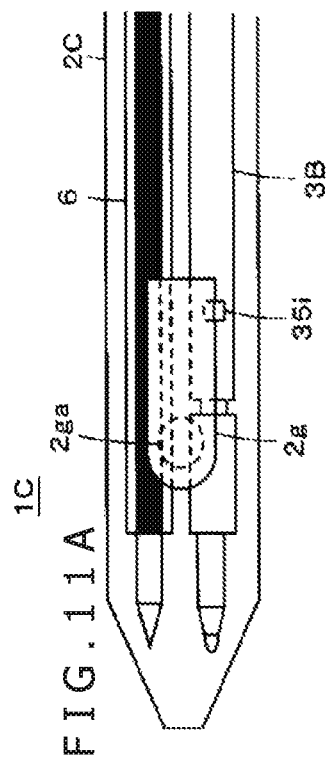
FIGS. 11A, 11B, and 11C are diagrams of assistance in explaining an example of a configuration of a two-color pen formed by simultaneously housing a ballpoint pen refill 6 and an electronic pen main body portion 3B.
Figure 11B:
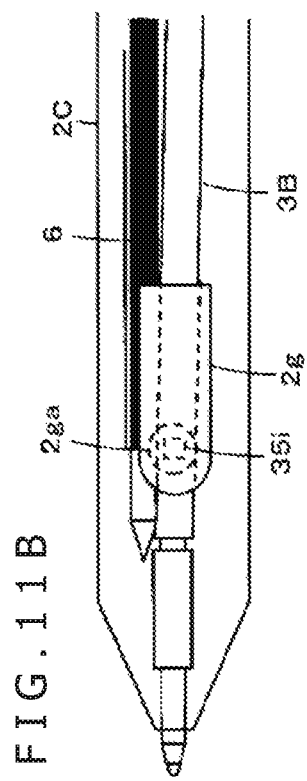
Figure 11C:
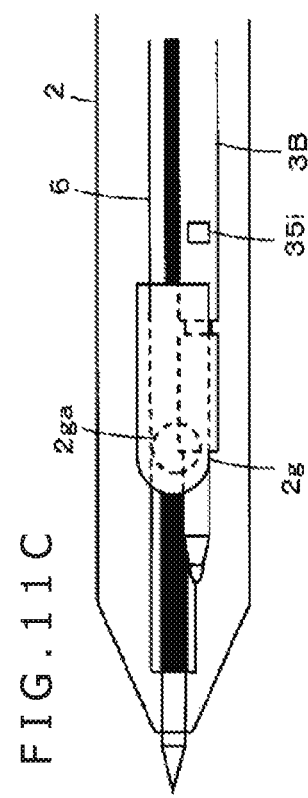

FIGS. 11A to 11C are diagrams of assistance in explaining an example of a configuration of an electronic pen 1C having the configuration of a two-color pen, which simultaneously houses the ballpoint pen refill 6 and the electronic pen main body portion 3B and can be used as a ballpoint pen or used as the electronic pen according to operation of the user. The ballpoint pen refill 6 used in a present modification is depicted in FIG. 2A described in the first embodiment. In addition, the electronic pen main body portion 3B is used in the electronic pen 1B depicted in FIGS. 9A and 9B described in the third embodiment.

As depicted in FIG. 11A, a casing 2C of the two-color pen according to the present modification is formed somewhat thicker to be able to house the ballpoint pen refill 6 and the electronic pen main body portion 3B. As depicted in FIG. 11B, when a depressing portion corresponding to the electronic pen main body portion 3B is depressed, the pen tip of the electronic pen main body portion 3B projects from an opening portion at a tip end of the casing 2C, so that the two-color pen can be used as an electronic pen. In this case, the ballpoint pen refill 6 is slightly shifted to a rear side so as to be away from the pen tip of the casing 2C of the electronic pen 1C. This prevents the pen tip of the ballpoint pen refill 6 or the like from interfering with a signal transmitted from the vicinity of the pen tip of the electronic pen main body portion 3B.

In addition, as depicted in FIG. 11B, the casing 2C of the electronic pen 1C is provided with the operating element 2g to enable depressing operation of the operation receiving portion of the switch part 35i provided to the tubular body portion 33B of the electronic pen main body portion 3B when the pen tip of the electronic pen main body portion 3B projects from the opening portion at the tip end of the casing 2C. A manner of providing the operating element 2g to the casing 2C and a manner of providing the switch part 35i to the tubular body portion 33B of the electronic pen main body portion 3B are similar to those of the third embodiment described with reference to FIGS. 9A and 9B and FIGS. 10A and 10B. Thus, when the two-color pen in the present example is used as an electronic pen, the operating element 2g provided to the casing 2C and the switch part 35i provided to the electronic pen main body portion 3B constitute a side switch, and the use of the side switch becomes possible.

In addition, as depicted in FIG. 11C, when a depressing portion corresponding to the ballpoint pen refill 6 is depressed, the pen tip of the ballpoint pen refill 6 projects from the opening portion of the tip end of the casing 2C, so that the two-color pen can be used as a ballpoint pen. In this case, the electronic pen main body portion 3B is slightly shifted to the rear side so as to be away from the pen tip of the ballpoint pen refill 6. When neither of the pen tip of the electronic pen main body portion 3B nor the pen tip of the ballpoint pen refill 6 projects from the opening portion of the tip end of the casing 2C as depicted in FIG. 11A, the position of the depressing portion 2ga of the operating part 2g and the position of the operation receiving portion of the switch part 35i of the electronic pen main body portion 3B are displaced from each other. The operating element 2g therefore cannot depress the operation receiving portion of the switch part 35i of the electronic pen main body portion 3B.

Similarly, as depicted in FIG. 11C, also when the pen tip of the ballpoint pen refill 6 projects from the opening portion of the tip end of the casing 2C, the position of the depressing portion 2ga of the operating part 2g and the position of the operation receiving portion of the switch part 35i of the electronic pen main body portion 3B are displaced from each other. Therefore, also in this case, the operating element 2g cannot depress the operation receiving portion of the switch part 35i of the electronic pen main body portion 3B. That is, as depicted in FIG. 11B, only when the pen tip of the electronic pen main body portion 3B projects from the opening portion of the tip end of the casing 2C, the position of the depressing portion 2ga of the operating part 2g and the position of the operation receiving portion of the switch part 35i of the electronic pen main body portion 3B coincide with each other, and the operating part 2g and the switch part 35i function as a side switch.

It is to be noted that while the above description has been made by taking as an example a case where a two-color pen is formed, the present disclosure is not limited to this, but is applicable also to cases where multi-color pens such as a three-color pen, a four-color pen, and the like are formed. Not only the electronic pen main body portion and ballpoint pen refills of various colors but also refills for the configuration of a so-called mechanical pencil can be mixed as refills.

In addition, in the present modification, a description has been made of a case where the electronic pen main body portion 3B provided with one switch part is used. However, there is no limitation to this. By providing two switch parts to the electronic pen main body portion, and using an operating element of the so-called seesaw type, it is possible to use a side switch that allows depressing operation of the operation receiving portion of one of the two switch parts.

In addition, it is of course possible to use a side switch formed by an operating element having contact portions constituted of conductors and terminals provided so as to be exposed on the tubular body portion of the electronic pen main body portion, as described in the first and second embodiments.

[Example of Using Position Detecting Device of Electromagnetic Induction Type]

The electronic pens according to the foregoing embodiments are used with a position detecting device of the electromagnetic induction transmitting and receiving type. However, there is no limitation to this. For example, the present disclosure can be applied to an electronic pen used with a position detecting device of an electromagnetic induction type that has only a function of receiving a signal for position indication or the like from the electronic pen without transmitting a signal to the electronic pen. The electronic pen in this case includes a circuit for supplying power, and can spontaneously transmit a signal for notifying an indicated position, a pen pressure, and side switch state information to the position detecting device of the electromagnetic induction type.

[Example of Using Position Detecting Device of Capacitive Coupling Type]

The present disclosure is also applicable to an electronic pen used with a position detecting device of a capacitive coupling type. The constituent parts of a side switch are similar to those of the foregoing first to third embodiments and the other examples and the modifications. However, the configuration of parts implementing basic functions thereof is different from that of the electromagnetic induction transmitting and receiving type or the electromagnetic induction type. The following description will be made of the configuration of an electronic pen used with a position detecting device of the capacitive coupling type, to which electronic pen the present disclosure is applied, and an example of a configuration of the position detecting device of the capacitive coupling type.

Figure 12:
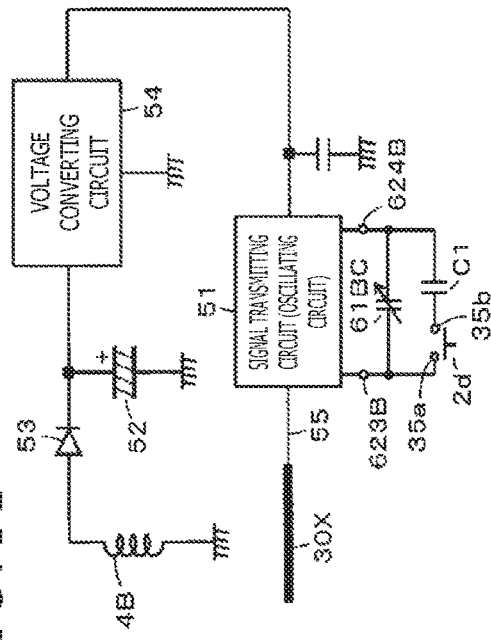
FIG. 12 is a diagram depicting an example of a circuit configuration of an electronic pen having the configuration of an active capacitive pen to which the present disclosure is applied.

FIG. 12 depicts an example of a circuit configuration of an electronic pen 1D having the configuration of an active capacitive pen in the present example. In the electronic pen 1D having the configuration of an active capacitive pen, a core body 30X has the configuration of an electrode core formed of a conductor, for example, a conductive metal or a hard resin mixed with a conductive powder. In the following description, the core body 30X will be referred to as an electrode core 30X.

In the present example, as depicted in FIG. 12, an electronic circuit formed on a printed board has a circuit configuration including a signal transmission circuit 51, an electric double layer capacitor 52 as an example of a storage element that generates a driving voltage (power supply voltage) for driving the signal transmission circuit 51, a rectifying diode 53, and a voltage conversion circuit 54. The signal transmission circuit 51 in the present example is formed by an oscillation circuit.

As in the foregoing embodiments, the electrode core 30X is inserted through a through hole of a ferrite core, and is fitted into a pressing member (pressure transmitting member) of a pen pressure detector. The electrode core 30X transmits a pen pressure to a pressure sensor 61B via the pressing member. The electrode core 30X is electrically connected to the signal transmission circuit 51 on the printed board by a connecting line 55.

As depicted in FIG. 12, two terminal members 623B and 624B of the pen pressure detector are electrically connected to the signal transmission circuit 51 formed on the printed board. The oscillation circuit constituting the signal transmission circuit 51 generates a signal that changes in frequency according to the capacitance of a variable capacitance capacitor 61BC of the pressure sensor 61B of the pen pressure detector, and supplies the generated signal to the electrode core 30X.

Further, a capacitor C1 and a side switch are connected in parallel with the signal transmission circuit 51. As with the side switch in the foregoing first embodiment, the side switch is a part constituted of an operating element 2d and terminals 35a and 35b provided to a tubular body portion of an electronic pen main body having the configuration of a refill for the electronic pen 1D. Thus, according to the on/off state of the side switch, connection/disconnection of the capacitor C1 to the signal transmission circuit 51 is selected, so that the frequency of a signal generated from the signal transmission circuit 51 can be changed.

When the electronic pen 1D in the present example is mounted on a charger not depicted, an induced electromotive force is generated in a coil 4B due to an alternating magnetic field generated by the charger, and charges the electric double layer capacitor 52 via the diode 53. The voltage conversion circuit 54 converts a voltage stored in the electric double layer capacitor 52 to a fixed voltage, and supplies the fixed voltage as power to the signal transmission circuit 51.

When the electronic pen 1D as a capacitive type stylus pen in the present example performs a normal operation (when the electronic pen 1D does not perform a charging operation), the coil 4B is at a fixed potential (ground potential (GND) in the present example), and therefore acts as a shield electrode provided around the periphery of the electrode core 30X. Incidentally, the fixed potential of the coil 4B when the capacitive system stylus pen performs the normal operation is not limited to the ground potential, but may be a positive side potential of the power supply, or may be a potential intermediate between the positive side potential of the power supply and the ground potential.

The signal transmission circuit (oscillation circuit) 51 generates a signal whose frequency changes according to the capacitance of the variable capacitance capacitor 61BC formed by the pressure sensor 61B of the pen pressure detector and the capacitance of the capacitor C1 when the capacitor C1 is connected to the signal transmission circuit 51 by the side switch, and supplies the generated signal to the electrode core 30X. The signal from the signal transmission circuit 51 is radiated from the electrode core 30X as an electric field based on the signal. The oscillation circuit constituting the signal transmission circuit 51 is formed by an LC oscillation circuit using resonance by a coil and a capacitor, for example. A position detecting device that detects the coordinate position of the capacitive type stylus pen as an example of the electronic pen 1D according to the present embodiment can determine a pen pressure applied to the electrode core 30X and the on/off state of the side switch from the frequency of the signal.

Figure 13:
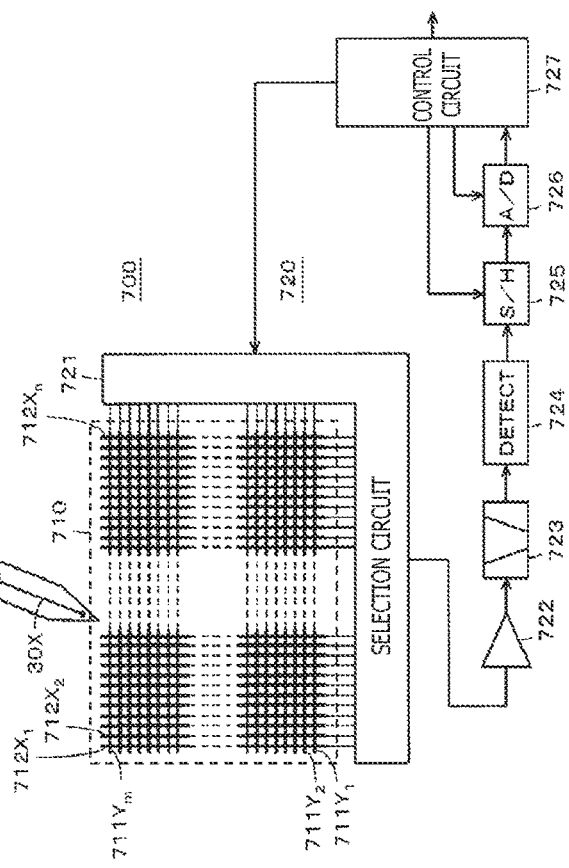
FIG. 13 is a diagram of assistance in explaining an example of a configuration of a position detecting device of a capacitive coupling type.

FIG. 13 is a block diagram of assistance in explaining a position detecting device 700 that receives the signal from the electronic pen 1D having the configuration of the capacitive type stylus pen, and detects a position on a sensor and detects a pen pressure and the state of the side switch.

As depicted in FIG. 13, the position detecting device 700 according to the present example is constituted of a sensor 710 and a pen detection circuit 720 connected to the sensor 710. Though a sectional view of the sensor 710 is omitted in the present example, the sensor 710 is formed by stacking a first conductor group 711, an insulating layer (not depicted), and a second conductor group 712 in order from a bottom layer side. The first conductor group 711 is, for example, a plurality of first conductors $711Y_1, 711Y_2, \ldots, 711Y_m$ (m is an integer of one or more) that extend in a horizontal direction (X-axis direction) and which are arranged in parallel with each other in a Y-axis direction so as to be separated from each other at predetermined intervals. In addition, the second conductor group 712 extends in a vertical direction (Y-axis direction) orthogonal to the first conductor group 711, and is arranged in parallel with each other in the X-axis direction so as to be separated from each other at predetermined intervals.

Thus, the sensor 710 of the position detecting device 700 has a configuration that detects a position indicated by the electronic pen 1D by using a sensor pattern formed by making the first conductor group 711 and the second conductor group 712 intersect each other.

Incidentally, in the following description, when each conductor of the first conductors $711Y_1, 711Y_2, \ldots, 711Y_m$ does not need to be distinguished from the other conductors, the conductor will be referred to as a first conductor 711Y. Similarly, when each conductor of the second conductors 712X$_1$, 712X$_2$, . . . , 712X$_n$ does not need to be distinguished from the other conductors, the conductor will be referred to as a second conductor 712X.

The pen detection circuit 720 includes a selection circuit 721 as an input-output interface with the sensor 710, an amplifier circuit 722, a band-pass filter 723, a detection circuit 724, a sample and hold circuit 725, an A/D (Analog to Digital) conversion circuit 726, and a control circuit 727.

The selection circuit 721 selects one conductor 711Y or 712X from the first conductor group 711 and the second conductor group 712 on the basis of a control signal from the control circuit 727. The conductor selected by the selection circuit 721 is connected to the amplifier circuit 722. A signal from the electronic pen 1D is detected by the selected conductor, and is amplified by the amplifier circuit 722. The output of the amplifier circuit 722 is supplied to the band-pass filter 723, where only a frequency component of the signal transmitted from the electronic pen 1D is extracted.

The output signal of the band-pass filter 723 is detected by the detection circuit 724. The output signal of the detection circuit 724 is supplied to the sample and hold circuit 725 to be sampled and held in predetermined timing according to a sampling signal from the control circuit 727, and is thereafter converted into a digital value by the A/D conversion circuit 726. The digital data from the A/D conversion circuit 726 is read and processed by the control circuit 727.

The control circuit 727 operates so as to send out respective control signals to the sample and hold circuit 725, the A/D conversion circuit 726, and the selection circuit 721 according to a program stored in an internal ROM (Read Only Memory). From the digital data from the A/D conversion circuit 726, the control circuit 727 calculates position coordinates on the sensor 710 which position coordinates are indicated by the electronic pen 1D, and detects a pen pressure detected by the pen pressure detector of the electronic pen 1D and the state of the side switch formed by the operating element 2d and the terminals 35a and 35b provided to the electronic pen main body portion.

In addition, while the coil 4B wound around the ferrite core is used as a coil for charging in the electronic pen 1D having the configuration of the active capacitive pen in the above-described example, a cell (battery) may be included as a source of supply of the power supply voltage for the signal transmission circuit 51. In that case, the ferrite core wound with the coil is not necessary.

In addition, in the electronic pen 1D having the configuration of the active capacitive pen in the above-described example, the signal transmission circuit 51 is configured as only the oscillation circuit, and a pen pressure and the on/off state of the side switch are transmitted as a change in the oscillation frequency of the oscillation circuit to the position detecting device. However, the signal transmission circuit may be formed by an oscillation circuit and a circuit that applies a predetermined modulation to the oscillation signal of the oscillation circuit, and pen pressure information and information indicating the on/off state of the side switch may be transmitted as, for example, an ASK signal as described above or the like to the position detecting device.

The present disclosure is thus applicable also to the so-called active capacitive pen (electronic pen) used with the position detecting device of the capacitive coupling type. In addition, the above description has been made by taking as an example a case where the side switch provided to the electronic pen 1 according to the first embodiment is used. However, there is no limitation to this. The side switches having the configurations described as the foregoing first to third embodiments and other examples and modifications are also applicable to the active capacitive pen.

Effects of Embodiments

As is clear from the description of the foregoing embodiments, functions of a side switch operating properly can be incorporated easily even in a case of configuring electronic pens implemented using various electronic pen main body portions detachable from a predetermined casing as in the case of a refill for a ballpoint pen.

Others

In the foregoing first and second embodiments, the hole portion 2h for attaching the operating element 2d or 2e is one hole portion. However, there is no limitation to this. The casing 2 or 2A can be provided with a plurality of hole portions according to the leg portions of the operating element 2d or 2e. In addition, various modes can be adopted for the shape, size, attaching method, and the like of the operating elements.

In the foregoing embodiments, the biasing members 2x1 and 2x2 such as leaf springs or the like are used in the example depicted in FIG. 3A, the biasing members 2y1 and 2y2 such as leaf springs or the like are used in the example depicted in FIG. 6A, and the biasing member 2z1 such as a leaf spring or the like is used in the example depicted in FIG. 7A. However, there is no limitation to this. In short, it is possible to use biasing members of various shapes and various materials which biasing members can function to displace the operating element 2d, 2e, or 2dA in a direction of the outside of the casing 2 or 2B.

What is claimed is:

1. An electronic pen comprising:
    a first casing that includes a side switch operating element that is operable by a user;
    an electronic pen main body which, in operation, performs an electronic pen function, the electronic pen main body being housed within the first casing; and
    a second casing that encloses the electronic pen main body, the second casing including a contact or an operation receiving portion of a switch that is exposed on the second casing and that is operable by the side switch operating element of the first casing,
    wherein:
        the second casing includes two contacts,
        the side switch operating element of the first casing includes two contact portions that correspond to the two contacts of the second casing, and are electrically connected to each other, and
        the side switch operating element is operable to establish an electrical connection between the two contacts of the second casing by bringing the two contact portions of the side switch operating element into contact with the two contacts of the second casing.

2. The electronic pen according to claim 1, wherein:
    the second casing includes three contacts,
    the side switch operating element of the first casing includes three contact portions that correspond to the three contacts of the second casing, and are electrically connected to each other, and
    the side switch operating element, in operation, switches between a state in which an electrical connection is established between a predetermined contact and a first contact among the three contacts of the second casing when the predetermined contact and the first contact are in contact with a predetermined contact portion and a first contact portion of the side switch operating element, and a state in which an electrical connection is established between the predetermined contact and a second contact among the three contacts of the second casing when the predetermined contact and the second contact are in contact with the predetermined contact portion and a second contact portion of the side switch operating element.

3. The electronic pen according to claim 2, wherein:
the three contacts of the second casing are collinear, and the three contact portions of the side switch operating element are collinear and correspond to the three contacts of the second casing, and
the side switch operating element is switchable between a state in which the predetermined contact and the first contact of the second casing are in contact with the predetermined contact portion and the first contact portion of the side switch operating element and a state in which the predetermined contact and the second contact of the second casing are in contact with the predetermined contact portion and the second contact portion of the side switch operating element.

4. The electronic pen according to claim 1, wherein:
the second casing includes the operation receiving portion of the switch,
the side switch operating element of the first casing includes a pressing portion corresponding to the operation receiving portion of the switch of the second casing, and
the side switch operating element, in operation, sets the switch in an on state by pressing the pressing portion of the side switch operating element against the operation receiving portion of the switch of the second casing.

5. The electronic pen according to claim 1, wherein:
the second casing includes a first operation receiving portion of a first switch and a second operation receiving portion of a second switch,
the side switch operating element of the first casing includes a first pressing portion corresponding to the first operation receiving portion of the second casing, and a second pressing portion corresponding to the second operation receiving portion of the second casing, and
the side switch operating element, in operation, switches between a state in which the first pressing portion of the side switch operating element presses the first operation receiving portion of the first switch of the second casing, and a state in which the second pressing portion of the side switch operating element presses the second operation receiving portion of the second switch of the second casing.

6. The electronic pen according to claim 1, wherein the second casing that encloses the electronic pen main body portion housed in the first casing is replaceable with a refill for a ballpoint pen.

7. The electronic pen according to claim 6, wherein:
the first casing is configured to house a plurality of second casings that enclose a plurality of electronic pen main bodies and a plurality of refills for a ballpoint pen, and
the first casing houses at least one of the second casings that enclose one of the electronic pen main bodies.

8. The electronic pen according to claim 1, further comprising:
a mechanism which, in operation, transitions the electronic pen main body between a state in which a whole of the electronic pen main body is housed within the first casing and a state in which a pen tip of the electronic pen main body is projected outside of the first casing,
wherein, when the pen tip of the electronic pen main body portion is projected outside of the first casing, the contact or the operation receiving portion of the switch of the second casing is operable by the side switch operating element of the first casing.

9. The electronic pen according to claim 1, further comprising:
a displacement unit, which in operation, displaces the side switch operating element of the first casing from inside of the first casing to outside of the first casing.

10. The electronic pen according to claim 1, wherein the second casing that encloses the electronic pen main body includes a resonance circuit that includes an inductor and a first capacitor.

11. The electronic pen according to claim 10, further comprising:
a second capacitor which, in operation, changes a frequency of an oscillation signal of the resonance circuit, wherein the side switch operating element, in operation, switches between a state in which the second capacitor is connected to the resonance circuit and a state in which the second capacitor is not connected to the resonance circuit.

12. The electronic pen according to claim 1, wherein the second casing that encloses the electronic pen main body includes a signal transmission circuit.

13. The electronic pen according to claim 12, further comprising:
a capacitor which, in operation, changes a frequency of an output signal of the signal transmission circuit included in the second casing that encloses the electronic pen main body, wherein the side switch operating element, in operation, switches between a state in which the capacitor is connected to the signal transmission circuit and a state in which the capacitor is not connected to the signal transmission circuit.

14. A device housed in a first casing of an electronic pen, the first casing having a side switch operating element that is operable by a user, the device comprising:
an electronic pen main body which, in operation, performs an electronic pen function; and
a second casing that encloses the electronic pen main body, the second casing including a contact or an operation receiving portion of a switch that is exposed on the second casing and that is operable by the side switch operating element of the first casing,
wherein:
the second casing includes two contacts,
the side switch operating element of the first casing includes two contact portions that correspond to the two contacts of the second casing, and are electrically connected to each other, and
the side switch operating element is operable to establish an electrical connection between the two contacts of the second casing by bringing the two contact portions of the side switch operating element into contact with the two contacts of the second casing.

15. The electronic pen main body portion according to claim 14, wherein:
the second casing includes three contacts,
the side switch operating element of the first casing includes three contact portions that correspond to the three contacts of the second casing, and are electrically connected to each other, and the side switch operating element, in operation, switches between a state in which an electrical connection is established between a predetermined contact and a first contact among the three contacts of the second casing when the predetermined contact and the first contact are in contact with a predetermined contact portion and a first contact portion of the side switch operating element, and a state in which an electrical connection is established between the predetermined contact and a second contact among the three contacts of the second casing when the predetermined contact and the second contact are in contact with the predetermined contact portion and a second contact portion of the side switch operating element.

16. The electronic pen main body portion according to claim 14, wherein:

the second casing includes the operation receiving portion of the switch, the side switch operating element of the first casing includes a pressing portion corresponding to the operation receiving portion of the switch of the second casing, and the side switch operating element, in operation, sets the switch in an on state by pressing the pressing portion of the side switch operating element against the operation receiving portion of the switch of the second casing.

17. An electronic pen comprising:

a first casing that includes a side switch operating element that is operable by a user;

an electronic pen main body which, in operation, performs an electronic pen function, the electronic pen main body being housed within the first casing;

a second casing that encloses the electronic pen main body, the second casing including a contact or an operation receiving portion of a switch that is exposed on the second casing and that is operable by the side switch operating element of the first casing; and a mechanism which, in operation, transitions the electronic pen main body between a state in which a whole of the electronic pen main body is housed within the first casing and a state in which a pen tip of the electronic pen main body is projected outside of the first casing, wherein, when the pen tip of the electronic pen main body portion is projected outside of the first casing, the contact or the operation receiving portion of the switch of the second casing is operable by the side switch operating element of the first casing.

* * * * *